(12) United States Patent
Song et al.

(10) Patent No.: US 11,764,369 B2
(45) Date of Patent: Sep. 19, 2023

(54) METHODS AND SYSTEMS FOR PRETREATING BIPOLAR PLATE AND USE THEREOF IN REDOX FLOW BATTERY

(71) Applicant: ESS Tech, Inc., Wilsonville, OR (US)

(72) Inventors: Yang Song, West Linn, OR (US); Yan Wu, Tigard, OR (US); Brady Thompson, Canby, OR (US)

(73) Assignee: ESS Tech, Inc., Wilsonville, OR (US)

( * ) Notice: Subject to any disclaimer, the term of this patent is extended or adjusted under 35 U.S.C. 154(b) by 0 days.

(21) Appl. No.: 17/650,513

(22) Filed: Feb. 9, 2022

(65) Prior Publication Data

US 2022/0278340 A1 Sep. 1, 2022

Related U.S. Application Data

(60) Provisional application No. 63/154,494, filed on Feb. 26, 2021.

(51) Int. Cl.
*H01M 8/0247* (2016.01)
*H01M 8/0228* (2016.01)
*H01M 8/18* (2006.01)

(52) U.S. Cl.
CPC ....... *H01M 8/0247* (2013.01); *H01M 8/0228* (2013.01); *H01M 8/188* (2013.01)

(58) Field of Classification Search
None
See application file for complete search history.

(56) References Cited

U.S. PATENT DOCUMENTS

| | | |
|---|---|---|
| 2016/0190604 A1 | 6/2016 | Evans et al. |
| 2016/0380264 A1 | 12/2016 | Winter et al. |
| 2017/0179516 A1* | 6/2017 | Evans ............... H01M 8/04731 |
| 2017/0256803 A1* | 9/2017 | Evans ................ H01M 4/8803 |
| 2019/0379062 A1 | 12/2019 | Fujita et al. |
| 2020/0052318 A1 | 2/2020 | Evans |

FOREIGN PATENT DOCUMENTS

| | | |
|---|---|---|
| JP | 2014207122 A | 10/2014 |
| WO | 2012167057 A2 | 6/2012 |

OTHER PUBLICATIONS

ISA Korean Intellectual Property Office, International Search Report and Written Opinion Issued in Application No. PCT/US2022/070596, WIPO, 14 pages.

* cited by examiner

*Primary Examiner* — Haroon S. Sheikh
(74) *Attorney, Agent, or Firm* — McCoy Russell LLP

(57) ABSTRACT

Systems and methods are provided for electrochemical and/or chemical pretreatment of bipolar plates, for example, for plating electrodes in redox flow batteries. In one example, a method may include pretreating a bipolar plate for the redox flow battery by disrupting a surface of the bipolar plate. In some examples, pretreating the bipolar plate may include positioning the bipolar plate within the redox flow battery, and thereafter charging the redox flow battery at multiple discrete plating current densities for each of one or more initial charging cycles to electrochemically etch the surface. In additional or alternative examples, pretreating the bipolar plate may include soaking the bipolar plate in solution to chemically treat the surface. In this way, the bipolar plate may be pretreated via electrochemical etching and/or chemical treatment so as to reduce electrochemical performance losses and dendrite formation in the redox flow battery.

8 Claims, 16 Drawing Sheets

METHODS AND SYSTEMS FOR PRETREATING BIPOLAR PLATE AND USE THEREOF IN REDOX FLOW BATTERY

CROSS REFERENCE TO RELATED APPLICATIONS

The present application claims priority to U.S. Provisional Application No. 63/154,494, entitled "METHOD AND SYSTEMS FOR PRETREATING BIPOLAR PLATE AND USE THEREOF IN REDOX FLOW BATTERY", and filed on Feb. 26, 2021. The entire contents of the above-listed application are hereby incorporated by reference for all purposes.

FIELD

The present description relates generally to systems and methods for pretreating bipolar plates, particularly for use with plating electrodes in redox flow batteries.

BACKGROUND AND SUMMARY

Redox flow batteries are suitable for grid-scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low-cost, earth-abundant materials. In general, iron redox flow batteries (IFBs) rely on iron, salt, and water for electrolyte, thus including simple, earth-abundant, and inexpensive materials, and eliminating incorporation of harsh chemicals and reducing an environmental footprint thereof.

The IFB may include a positive (redox) electrode where a redox reaction occurs and a negative (plating) electrode where ferrous iron ($Fe^{2+}$) in the electrolyte may be reduced and plated. Various side reactions may compete with the $Fe^{2+}$ reduction, including proton reduction, iron corrosion, and iron plating oxidation:

$H^+ + e^- \leftrightarrow \frac{1}{2}H_2$ (proton reduction)     (1)

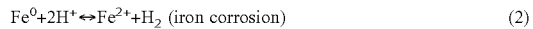

$Fe^0 + 2H^+ \leftrightarrow Fe^{2+} + H_2$ (iron corrosion)     (2)

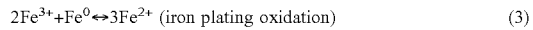

$2Fe^{3+} + Fe^0 \leftrightarrow 3Fe^{2+}$ (iron plating oxidation)     (3)

As most side reactions occur at the plating electrode, IFB cycling capabilities may be limited by available iron plating on the plating electrode. Exemplary attempts to ameliorate iron plating loss have focused on catalytic electrolyte rebalancing to address hydrogen gas generation from equations (1) and (2) via equation (4):

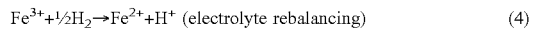

$Fe^{3+} + \frac{1}{2}H_2 \rightarrow Fe^{2+} + H^+$ (electrolyte rebalancing)     (4)

In some examples, the redox and plating electrodes may be in physical or fluid contact with respective bipolar plates. The bipolar plates may desirably be highly conductive, such that the electrolyte may be transported to reaction sites of the redox and plating electrodes, and may further serve as fluid separators for electrolyte flow and distribution. In one example, a bipolar plate installed for use with the plating electrode may be formed from a graphite composite. Preparation of the graphite composite based bipolar plate may include compression or injection molding of a graphite composite starting material. In some examples, such molding processes may generate a resin-rich layer on one or more surfaces of the bipolar plates. However, bipolar plates formed in this way may be ill-suited for IFB inclusion, as the resin-rich layer may induce relatively high resistance and relatively poor conductivity and result in relatively poor plating quality.

Accordingly, pretreatment of molded graphite composite based bipolar plates may be employed to mitigate poor electrochemical performance therefrom during IFB operation. For example, the bipolar plates may be mechanically pretreated via abrasion, sand blasting, sand paper polishing, a timing belt, etc. However, such mechanical pretreatments may result in unwanted fragments being retained at the bipolar plates, as well as workflow implementation difficulties (e.g., extra manufacturing steps and relatively lengthy timescales, precluding large scale IFB manufacturing).

In one example, the issues described above may be addressed by a method for a redox flow battery, the method including pretreating a bipolar plate for the redox flow battery by disrupting at least one surface of the bipolar plate, and initiating charge cycling of the redox flow battery, wherein the redox flow battery may include an electrode compartment, the electrode compartment housing the pretreated bipolar plate upon initiation of charge cycling. In some examples, pretreating the bipolar plate may include positioning the bipolar plate within the electrode compartment, and thereafter charging the redox flow battery at multiple discrete plating current densities for each of one or more initial charging cycles to electrochemically etch the at least one surface. In additional or alternative examples, pretreating the bipolar plate may include soaking the bipolar plate in an $FeCl_3$ solution to chemically treat the at least one surface. In this way, the at least one surface of the bipolar plate may be etched and roughened, and substantially free of cracking and excess particulates and flakes, such that electrochemical performance of the redox flow battery may be maintained without sacrificing long-term durability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2B shows a flow chart of a method for electrochemically and chemically pretreating a bipolar plate for use with the redox flow battery system of. FIG. 2A FIG. 3 shows a top perspective view of pristine and electrochemically etched bipolar plates.

DETAILED DESCRIPTION

The following description relates to systems and methods for electrochemically and/or chemically pretreating a bipolar plate for use with a negative electrode, for example, in a redox flow battery. The redox flow battery is depicted schematically in FIG. 1 with an integrated multi-chamber tank having separate positive and negative electrolyte chambers. In some examples, the redox flow battery may be an all-iron flow battery (IFB) utilizing iron redox chemistry at both a positive (redox) electrode and the negative (plating) electrode of the IFB. The electrolyte chambers may be coupled to one or more battery cells, each cell including the positive and negative electrodes. Therefrom, electrolyte may be pumped through positive and negative electrode compartments respectively housing the positive and negative electrodes. The positive and negative electrode compartments may further house respective bipolar plates positioned to facilitate electrolyte flow through the respective electrode compartments and to reaction sites at the respective electrodes.

Additionally or alternatively, the redox flow battery may be a hybrid redox flow battery. Hybrid redox flow batteries are redox flow batteries which may be characterized by deposition of one or more electroactive materials as a solid layer on an electrode (e.g., the negative electrode). Hybrid redox flow batteries may, for instance, include a chemical species which may plate via an electrochemical reaction as a solid on a substrate throughout a battery charge process. During battery discharge, the plated species may ionize via a further electrochemical reaction, becoming soluble in the electrolyte. In hybrid redox flow battery systems, a charge capacity (e.g., a maximum amount of energy stored) of the redox flow battery may be limited by an amount of metal plated during battery charge and may accordingly depend on an efficiency of the plating system (e.g., including the bipolar plates) as well as volume and surface area available for plating.

Figure 2A:
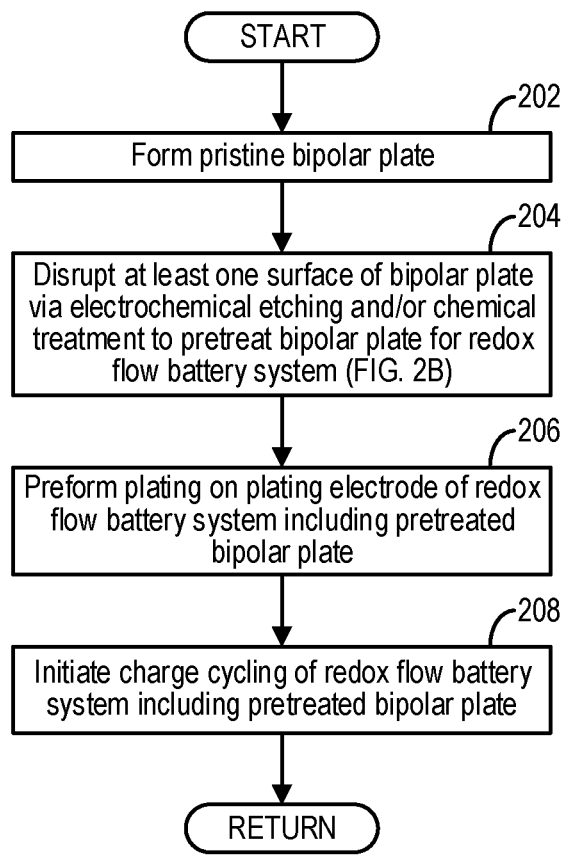
FIG. 2A shows a flow chart of a method for preparing and operating a redox flow battery system including a pretreated bipolar plate.
Figure 2B:
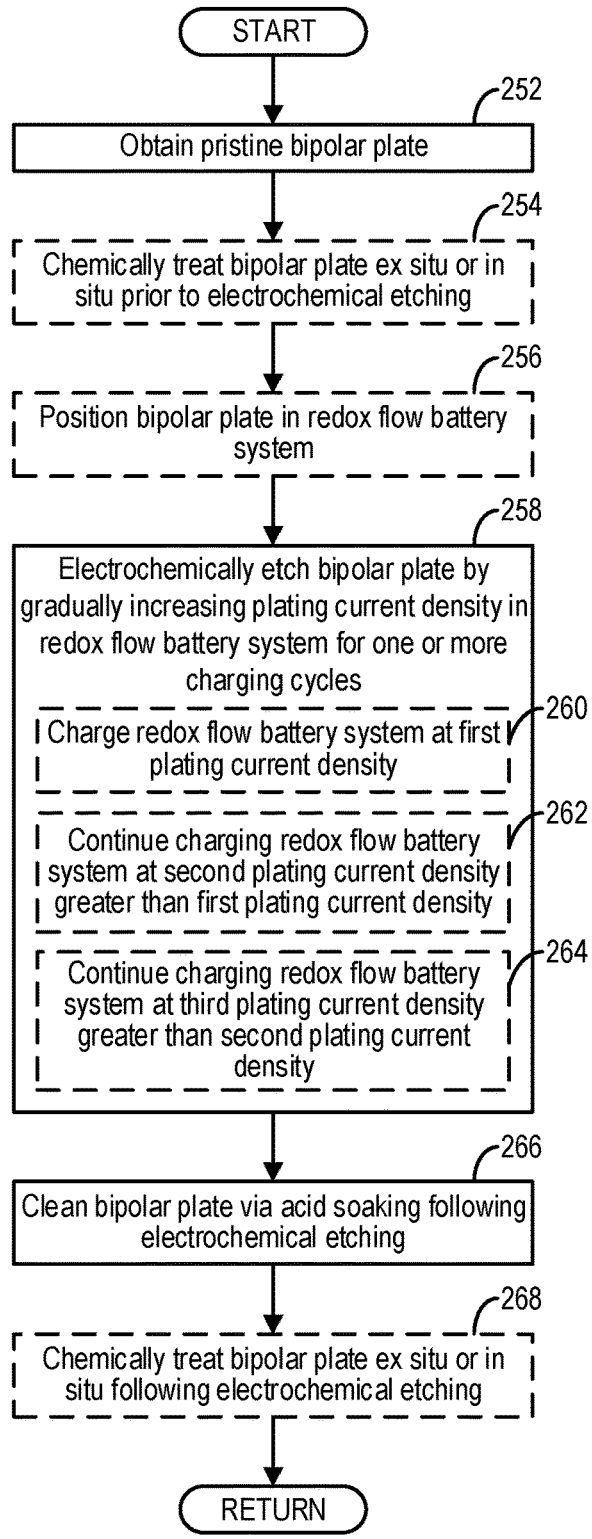

In some examples, the bipolar plates may include a resin rich layer following manufacturing, which may result in relatively high resistance and relatively poor plating and conductivity at the negative electrode. For example, the bipolar plate included in the negative electrode compartment may be formed by injection molding or compression molding a graphite composite material, resulting in the resin rich layer. Such bipolar plates may desirably be pretreated so as to disrupt, reduce, and/or otherwise deform the resin rich layer and thereby mitigate electrochemical performance losses ascribed thereto. Accordingly, in embodiments provided herein, a redox flow battery system may include a bipolar plate that has been electrochemically and/or chemically pretreated such that a resin rich layer thereof is etched or otherwise roughened. Example methods for pretreating the bipolar plate and for preparing and operating the redox flow battery system including the pretreated bipolar plate are depicted at FIGS. 2A and 2B.

Figure 3:
Figure 4:
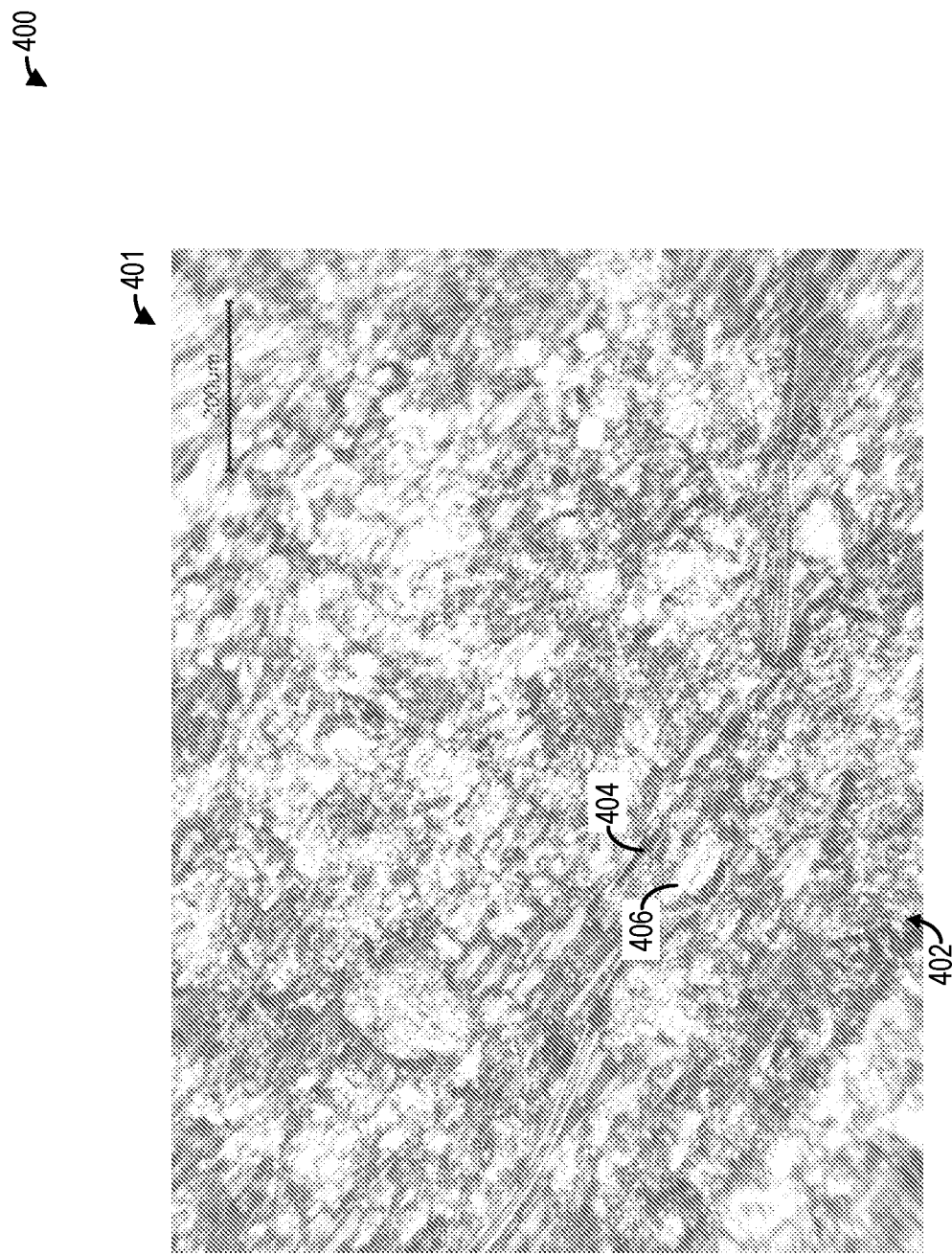
FIG. 4 shows a magnified view of a first exemplary bipolar plate prior to each of electrochemical step charging pretreatment and initial charge cycling of a redox flow battery system including the first exemplary bipolar plate.
Figure 5:
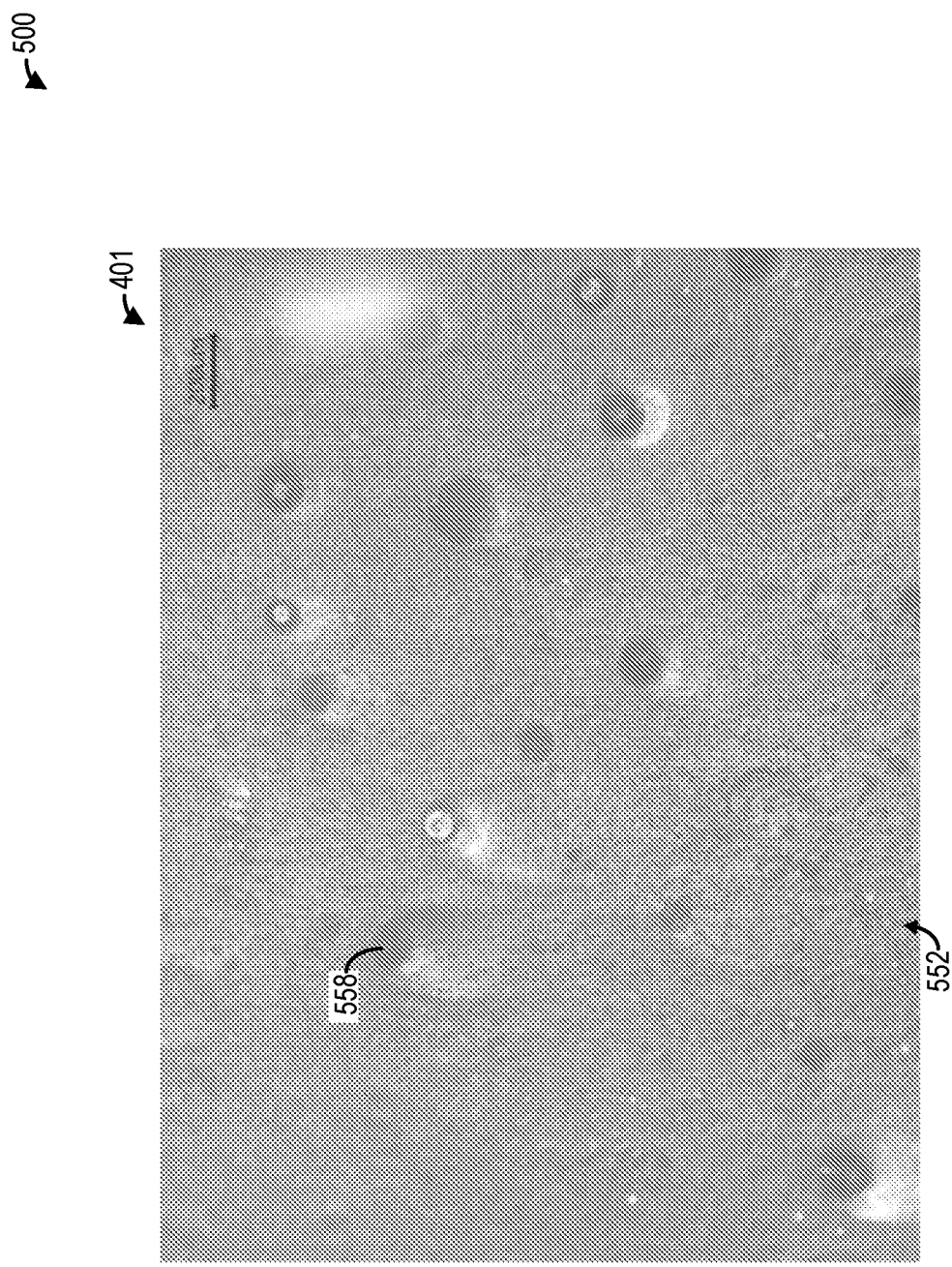
FIG. 5 shows a magnified view of the first exemplary bipolar plate following electrochemical step charging pretreatment and prior to initial charge cycling of the redox flow battery system including the first exemplary bipolar plate.
Figure 6A:
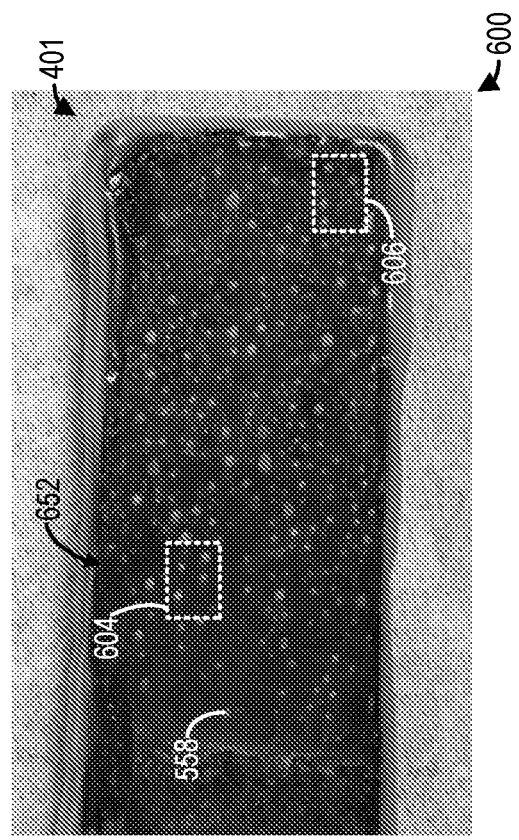
FIG. 6A shows a top view of the first exemplary bipolar plate following each of electrochemical step charging pretreatment and initial charge cycling of the redox flow battery system including the first exemplary bipolar plate.
Figure 6C:
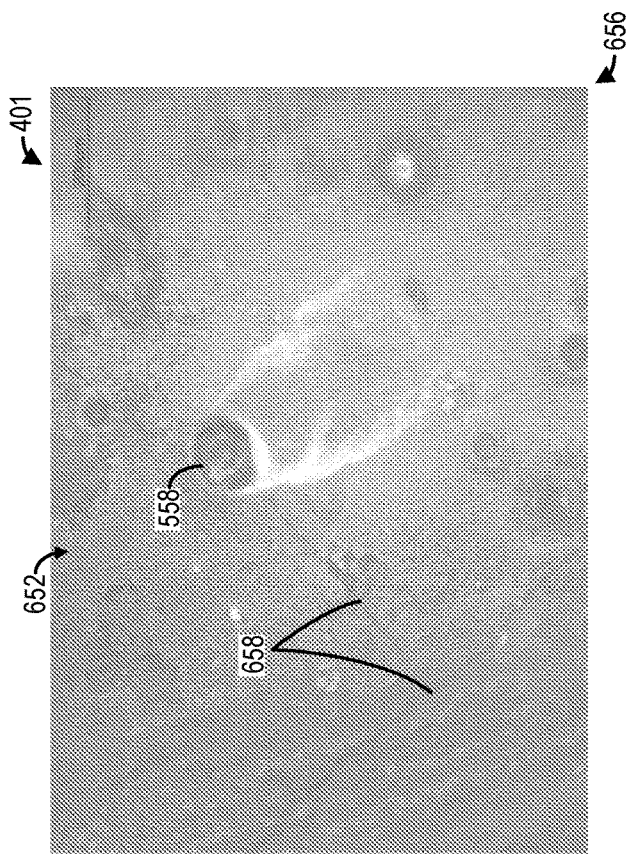
FIG. 6C shows a second magnified view of the first exemplary bipolar plate of FIG. 6A.
Figure 6B:
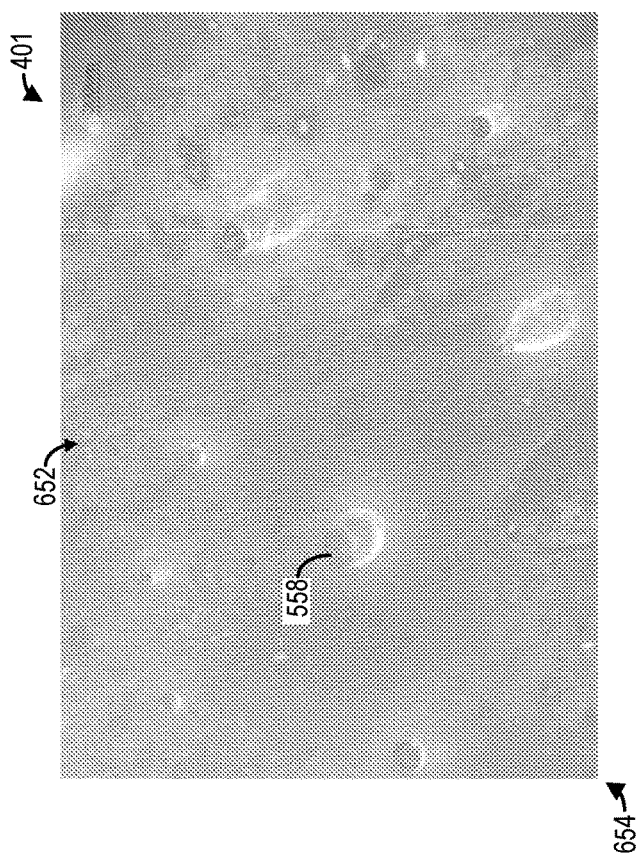
FIG. 6B shows a first magnified view of the first exemplary bipolar plate of FIG. 6A.
Figure 7:
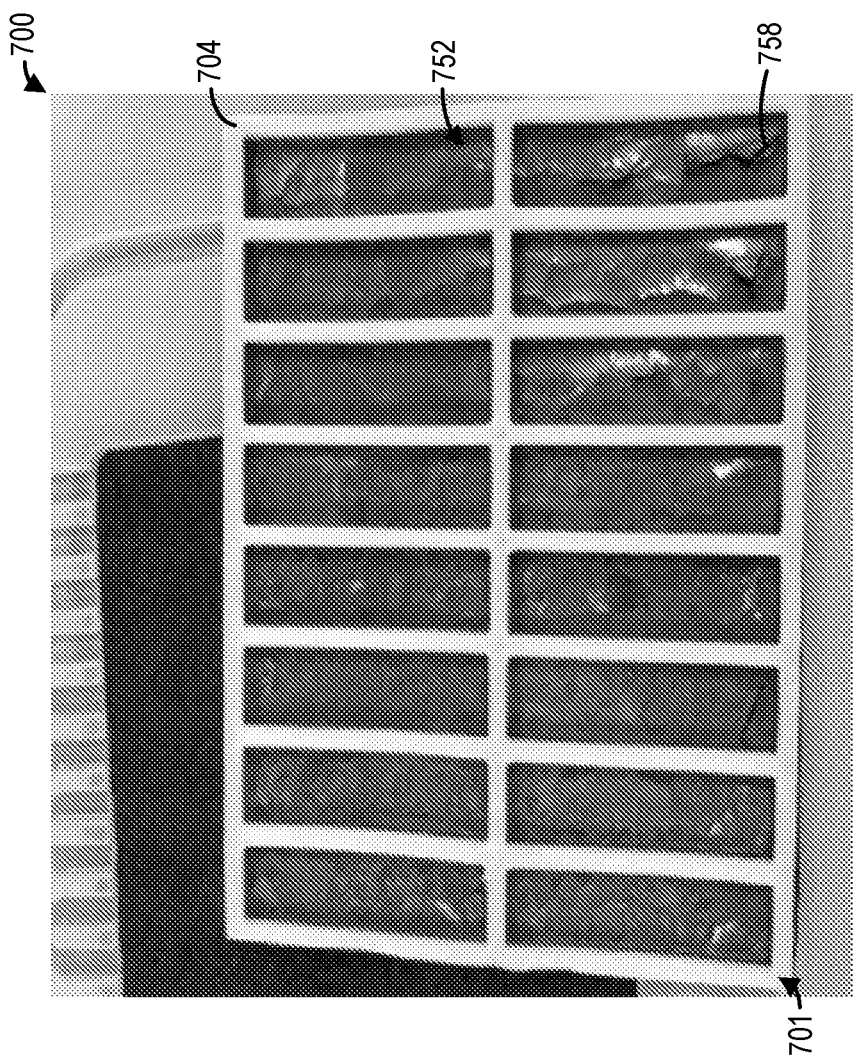
FIG. 7 shows a top view of a second exemplary bipolar plate following electrochemical step charging pretreatment and prior to initial charge cycling of a redox flow battery system including the second exemplary bipolar plate.
Figure 8B:
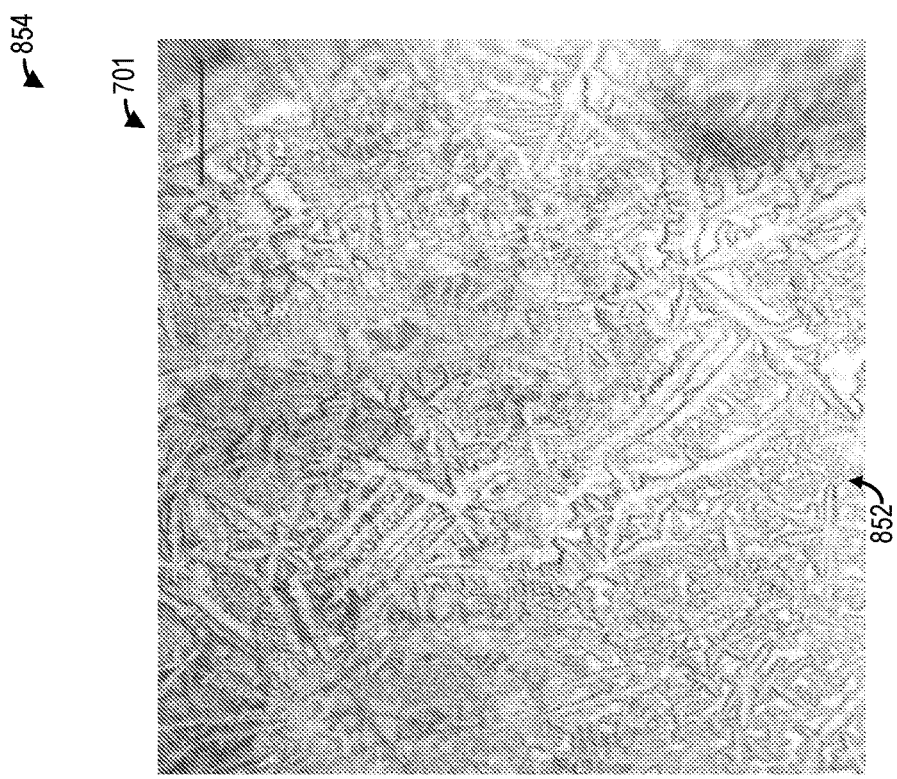
FIG. 8B shows a magnified view of the second exemplary bipolar plate of FIG. 8A.
Figure 8A:
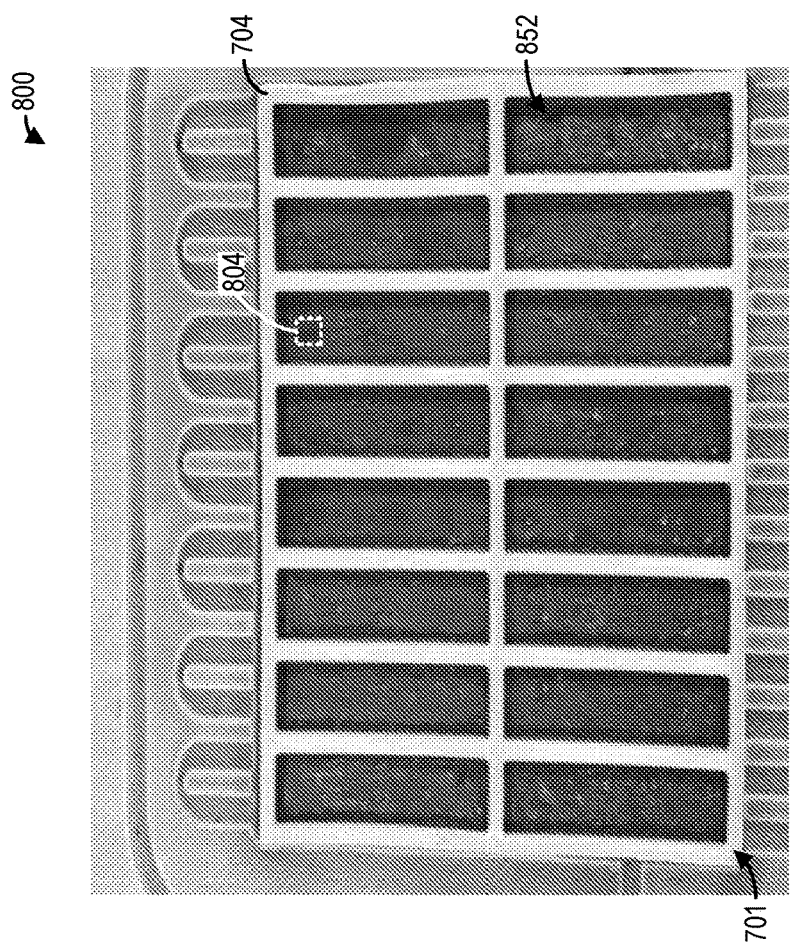
FIG. 8A shows a top view of the second exemplary bipolar plate following each of electrochemical step charging pretreatment and initial charge cycling of the redox flow battery system including the second exemplary bipolar plate.
Figure 9:
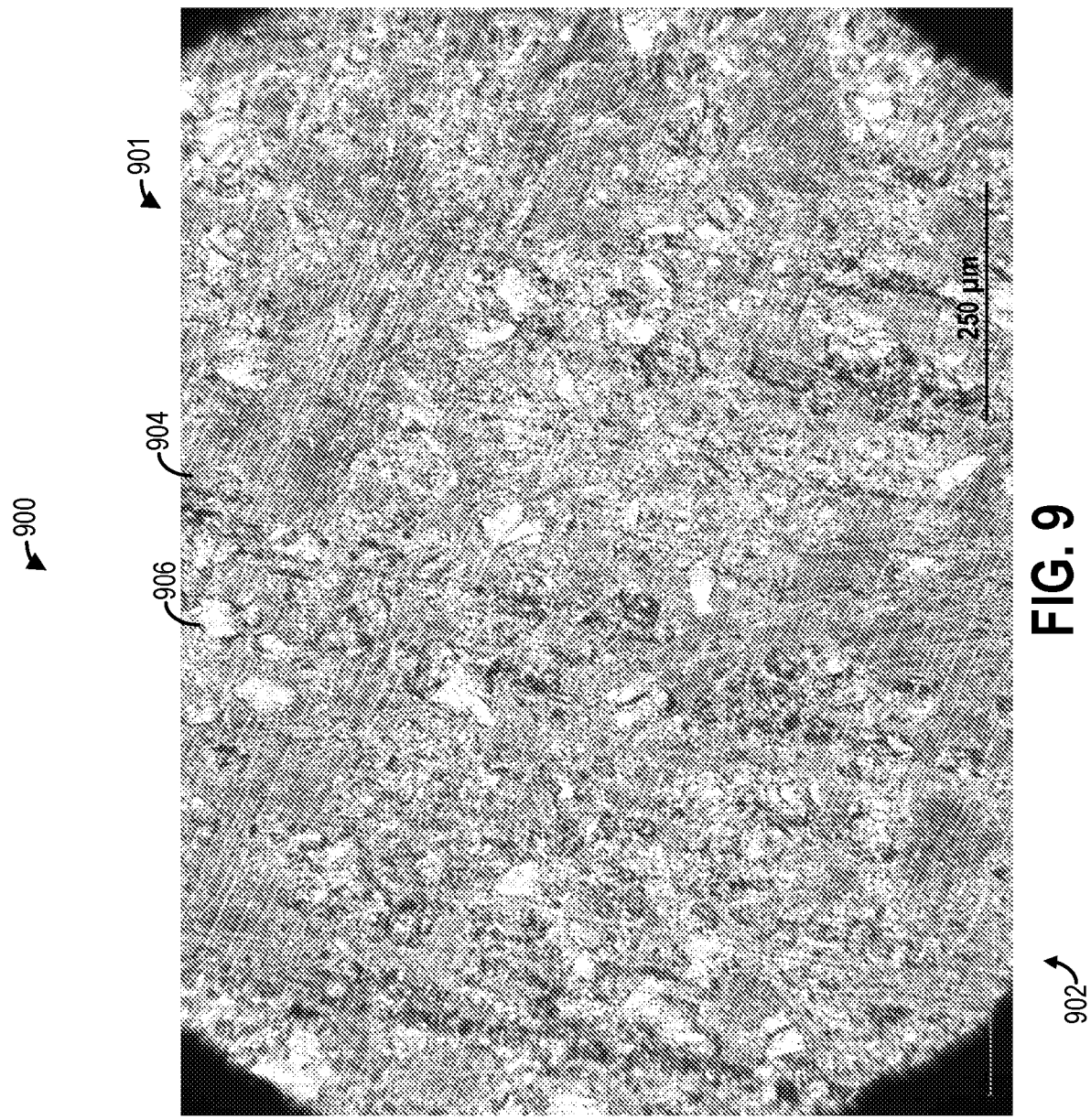
FIG. 9 shows a magnified view of a third exemplary bipolar plate prior to electrochemical step charging pretreatment of a redox flow battery system including the third exemplary bipolar plate.
Figure 10:
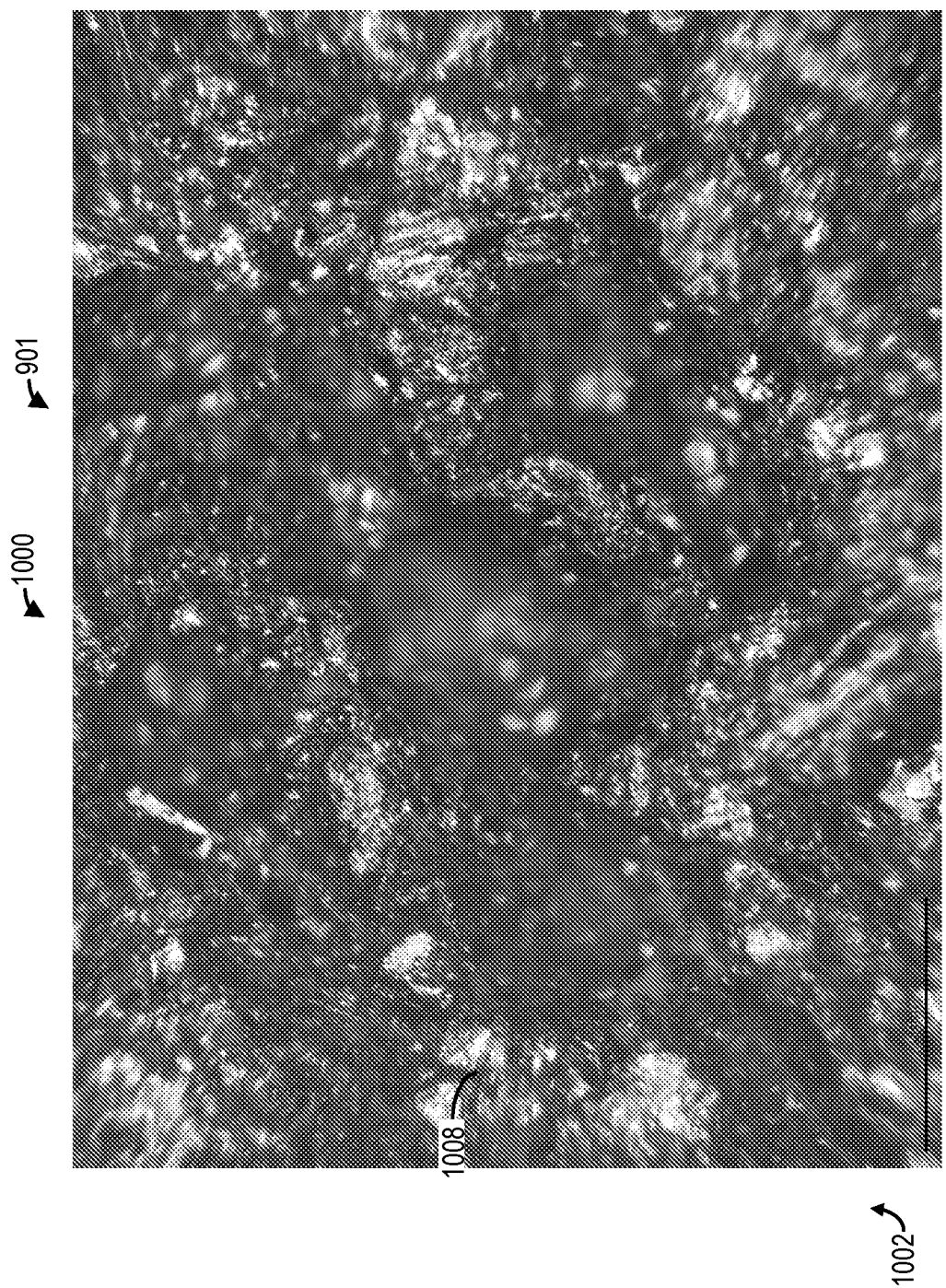
FIG. 10 shows a magnified view of the third exemplary bipolar plate following electrochemical step charging pretreatment of the redox flow battery system including the third exemplary bipolar plate.

For comparison, top perspective views of pristine (e.g., untreated) and electrochemically etched bipolar plates are depicted at FIG. 3. The electrochemical etching may be realized via a step charging process so as to obtain sufficient roughness and coverage of the etching without subsequent flaking. As one example, magnified views of a first exemplary bipolar plate respectively prior to and following electrochemical pretreatment are depicted at FIGS. 4 and 5. FIGS. 6A-C further depict the first exemplary bipolar plate following each of electrochemical pretreatment and initial charge cycling of a redox flow battery system including the first exemplary bipolar plate. As another example, a second exemplary bipolar plate following electrochemical pretreatment and respectively prior to and following initial charge cycling of a redox flow battery system including the second exemplary bipolar plate are depicted at FIGS. 7 and 8A-B. As yet another example, a third exemplary bipolar plate respectively prior to and following electrochemical pretreatment a redox flow battery system including the third exemplary bipolar plate are depicted at FIGS. 9 and 10.

Figure 13:
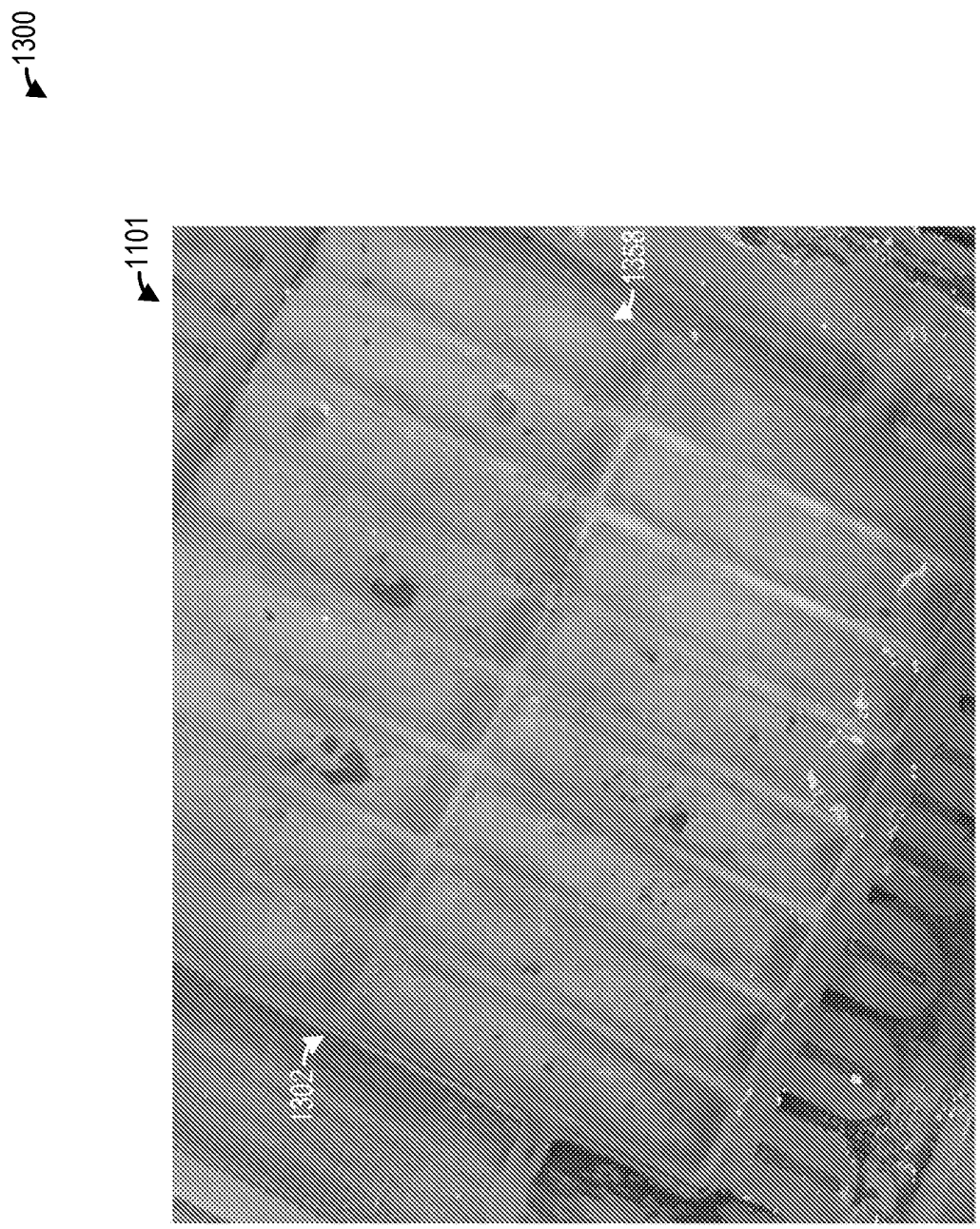
FIG. 13 shows a top view of a membrane separator of the redox flow battery system including the fourth exemplary bipolar plate following each of chemical pretreatment and initial charge cycling of the redox flow battery system.
Figure 14:
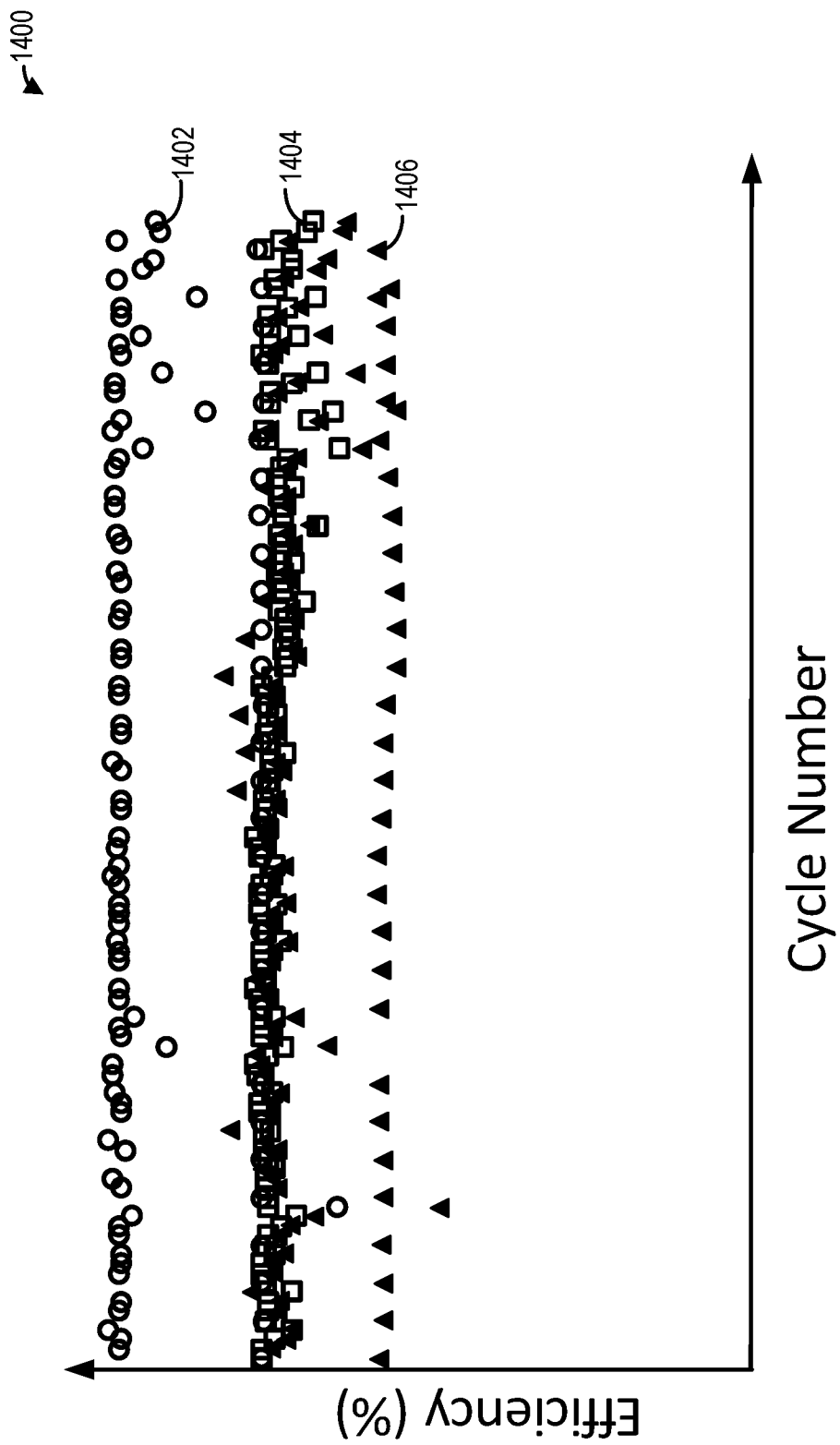
FIG. 14 shows an example plot illustrating each of coulombic, voltaic, and energy efficiencies of the redox flow battery system including the fourth exemplary bipolar plate following initial charge cycling of the redox flow battery system.

Additionally or alternatively, the bipolar plate may be chemically treated via $FeCl_3$ soaking. As one example, an exemplary chemically pretreated bipolar plate prior to and following initial charge cycling of a redox flow battery system including the exemplary chemically pretreated bipolar plate are respectively depicted at FIGS. 11 and 12. FIG. 13 further depicts a membrane separator of the redox flow battery system including the exemplary chemically pretreated bipolar plate following the initial charge cycling. FIG. 14 further depicts an example plot illustrating each of coulombic, voltaic, and energy efficiencies of the redox flow battery system including the exemplary chemically pretreated bipolar plate following the initial charge cycling.

Figure 1:
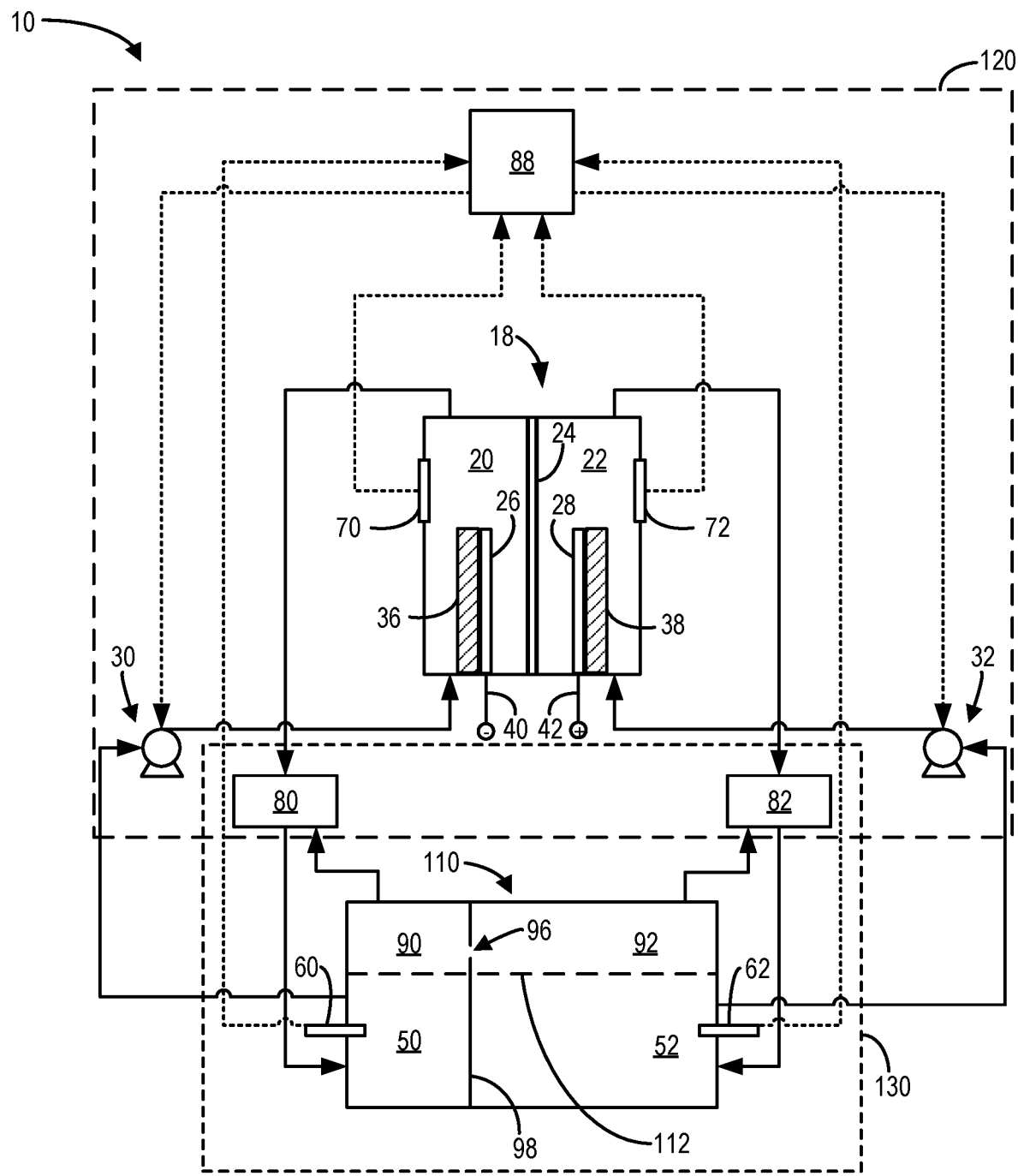
FIG. 1 shows a schematic diagram of an example redox flow battery system including a battery cell with redox and plating electrodes, bipolar plates, and a membrane separator.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a redox flow battery cell 18 may be referred to as a plating electrolyte, and a positive electrolyte on a redox side (e.g., a positive electrode compartment 22) of the redox flow battery cell 18 may be referred to as a redox electrolyte.

"Anode" refers to an electrode where electroactive material loses electrons and "cathode" refers to an electrode where electroactive material gains electrons. During battery charge, the positive electrolyte gains electrons at the negative electrode 26, and the negative electrode 26 is the cathode of the electrochemical reaction. During battery discharge, the positive electrolyte loses electrons, and the negative electrode 26 is the anode of the electrochemical reaction. Alternatively, during battery discharge, the negative electrolyte and the negative electrode 26 may be respectively referred to as an anolyte and the anode of the electrochemical reaction, while the positive electrolyte and the positive electrode 28 may be respectively referred to as a catholyte and the cathode of the electrochemical reaction. During battery charge, the negative electrolyte and the negative electrode 26 may be respectively referred to as the catholyte and the cathode of the electrochemical reaction, while the positive electrolyte and the positive electrode 28 may be respectively referred to as the anolyte and the anode of the electrochemical reaction. For simplicity, the terms "positive" and "negative" are used herein to refer to the electrodes, electrolytes, and electrode compartments in redox flow battery systems.

One example of a hybrid redox flow battery is an all-iron redox flow battery (IFB), in which the electrolyte includes iron ions in the form of iron salts (e.g., $FeCl_2$, $FeCl_3$, and the like), wherein the negative electrode 26 includes metal iron. For example, at the negative electrode 26, ferrous iron ($Fe^{2+}$) gains two electrons and plates as iron metal ($Fe^0$) onto the negative electrode 26 during battery charge, and $Fe^0$ loses two electrons and re-dissolves as $Fe^{2+}$ during battery discharge. At the positive electrode 28, $Fe^{2+}$ loses an electron to form ferric iron ($Fe^{3+}$) during battery charge, and $Fe^{3+}$ gains an electron to form $Fe^{2+}$ during battery discharge. The electrochemical reaction is summarized in equations (5) and (6), wherein the forward reactions (left to right) indicate electrochemical reactions during battery charge, while the reverse reactions (right to left) indicate electrochemical reactions during battery discharge:

$$Fe^{2+}+2e^- \leftrightarrow Fe^0 -0.44 \text{ V (negative electrode)} \quad (5)$$

$$Fe^{2+} \leftrightarrow 2Fe^{3+}+2e^- +0.77 \text{ V (positive electrode)} \quad (6)$$

As discussed above, the negative electrolyte used in the IFB may provide a sufficient amount of $Fe^{2+}$ so that, during battery charge, $Fe^{2+}$ may accept two electrons from the negative electrode 26 to form $Fe^0$ and plate onto a substrate. During battery discharge, the plated $Fe^0$ may lose two electrons, ionizing into $Fe^{2+}$ and dissolving back into the electrolyte. An equilibrium potential of the above reaction is −0.44 V and this reaction therefore provides a negative terminal for the desired system. On the positive side of the IFB, the electrolyte may provide $Fe^{2+}$ during battery charge which loses an electron and oxidizes to $Fe^{3+}$. During battery discharge, $Fe^{3+}$ provided by the electrolyte becomes $Fe^{2+}$ by absorbing an electron provided by the positive electrode 28. An equilibrium potential of this reaction is +0.77 V, creating a positive terminal for the desired system.

The IFB may provide the ability to charge and recharge electrolytes therein in contrast to other battery types utilizing non-regenerating electrolytes. Charge may be achieved by respectively applying a current across the electrodes 26 and 28 via terminals 40 and 42. The negative electrode 26 may be coupled via the terminal 40 to a negative side of a voltage source so that electrons may be delivered to the negative electrolyte via the positive electrode 28 (e.g., as $Fe^{2+}$ is oxidized to $Fe^{3+}$ in the positive electrolyte in the positive electrode compartment 22). The electrons provided to the negative electrode 26 may reduce the $Fe^{2+}$ in the negative electrolyte to form $Fe^0$ at the (plating) substrate, causing the $Fe^{2+}$ to plate onto the negative electrode 26.

Discharge may be sustained while $Fe^0$ remains available to the negative electrolyte for oxidation and while $Fe^{3+}$ remains available in the positive electrolyte for reduction. As an example, $Fe^{3+}$ availability may be maintained by increasing a concentration or a volume of the positive electrolyte in the positive electrode compartment 22 side of the redox flow battery cell 18 to provide additional $Fe^{3+}$ ions via an external source, such as an external positive electrolyte chamber 52. More commonly, availability of $Fe^0$ during discharge may be an issue in IFB systems, wherein the $Fe^0$ available for discharge may be proportional to a surface area and a volume of the negative electrode substrate, as well as to a plating efficiency. Charge capacity may be dependent on the availability of $Fe^{2+}$ in the negative electrode compartment 20. As an example, $Fe^{2+}$ availability may be maintained by providing additional $Fe^{2+}$ ions via an external source, such as an external negative electrolyte chamber 50 to increase a concentration or a volume of the negative electrolyte to the negative electrode compartment 20 side of the redox flow battery cell 18.

In an IFB, the positive electrolyte may include ferrous iron, ferric iron, ferric complexes, or any combination thereof, while the negative electrolyte may include ferrous iron or ferrous complexes, depending on a state of charge (SOC) of the IFB system. As previously mentioned, utilization of iron ions in both the negative electrolyte and the positive electrolyte may allow for utilization of the same electrolytic species on both sides of the redox flow battery cell 18, which may reduce electrolyte cross-contamination and may increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, microporous membrane, and the like). For example, $Fe^{3+}$ ions in the positive electrolyte may be driven toward the negative electrolyte by a $Fe^{3+}$ ion concentration gradient and an electrophoretic force across the separator 24. Subsequently, $Fe^{3+}$ ions penetrating the separator 24 and crossing over to the negative electrode compartment 20 may result in coulombic efficiency losses. $Fe^{3+}$ ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul an organic functional group of an ion-exchange membrane or physically clog micropores of the ion-exchange membrane. In either case, due to the $Fe(OH)_3$ precipitate, membrane ohmic resistance may rise over time and battery performance may degrade. Precipitate may be removed by washing the IFB with acid, but constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits $Fe^{3+}$ ion crossover may also mitigate fouling.

Additional coulombic efficiency losses may be caused by reduction of $H^+$ (e.g., protons) and subsequent formation of $H_2$ (e.g., hydrogen gas), and a reaction of protons in the negative electrode compartment 20 with electrons supplied at the plated iron metal of the negative electrode 26 to form hydrogen gas.

The IFB electrolyte (e.g., $FeCl_2$, $FeCl_3$, $FeSO_4$, $Fe_2(SO_4)_3$, and the like) may be readily available and may be produced at low costs. In one example, the IFB electrolyte may be formed from ferrous chloride ($FeCl_2$), potassium chloride (KCl), manganese(II) chloride ($MnCl_2$), and boric acid ($H_3BO_3$). The IFB electrolyte may offer higher reclamation value because the same electrolyte may be used for the negative electrolyte and the positive electrolyte, consequently reducing cross-contamination issues as compared to other systems. Furthermore, because of iron's electron configuration, iron may solidify into a generally uniform solid structure during plating thereof on the negative electrode substrate. For zinc and other metals commonly used in hybrid redox batteries, solid dendritic structures may form during plating. A stable electrode morphology of the IFB system may increase the efficiency of the battery in comparison to other redox flow batteries. Further still, iron redox flow batteries may reduce the use of toxic raw materials and may operate at a relatively neutral pH as compared to other redox flow battery electrolytes. Accordingly, IFB systems may reduce environmental hazards as compared with all other current advanced redox flow battery systems in production.

Continuing with FIG. 1, a schematic illustration of the redox flow battery system 10 is shown. The redox flow battery system 10 may include the redox flow battery cell 18 fluidly coupled to an integrated multi-chambered electrolyte storage tank 110. The redox flow battery cell 18 may include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, and as discussed above, the separator 24 may include an ion-exchange membrane and/or a microporous membrane.

The negative electrode compartment 20 may include the negative electrode 26, and the negative electrolyte may include electroactive materials. The positive electrode compartment 22 may include the positive electrode 28, and the positive electrolyte may include electroactive materials. In some examples, multiple redox flow battery cells 18 may be combined in series or in parallel to generate a higher voltage or current in the redox flow battery system 10.

Further illustrated in FIG. 1 are negative and positive electrolyte pumps 30 and 32, both used to pump electrolyte solution through the redox flow battery system 10. Electrolytes are stored in one or more tanks external to the cell, and are pumped via the negative and positive electrolyte pumps 30 and 32 through the negative electrode compartment 20 side and the positive electrode compartment 22 side of the redox flow battery cell 18, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates 36 and 38 may be arranged proximate but spaced away from the electrodes 26 and 28 and housed within the respective electrode compartments 20 and 22. The IFB electrolytes may be transported to reaction sites at the negative and positive electrodes 26 and 28 by the first and second bipolar plates 36 and 38, resulting from conductive properties of a material of the bipolar plates 36 and 38. Electrolyte flow may also be assisted by the negative and positive electrolyte pumps 30 and 32, facilitating forced convection through the redox flow battery cell 18. Reacted electrochemical species may also be directed away from the reaction sites by a combination of forced convection and a presence of the first and second bipolar plates 36 and 38.

In some examples, one or both of the bipolar plates 36 and 38 may be formed from a carbon-based material (such as graphite or carbon fibers) or a carbon-based composite material (such as a graphite composite material) and bound by a binder (such as a resin). For instance, the graphite composite material may be shaped into a given bipolar plate via a compression molding process or an injection molding process. As a result of the molding process, a resin rich layer may form at an outer surface of the given bipolar plate. The resin rich layer may be undesirable for electrochemical performance, the layer contributing to relatively high resistance and relatively low conductivity. Further, if the resin rich layer is included in the first bipolar plate 36 in the negative electrode compartment 20 without subsequent treatment, the layer may further contribute to relatively poor plating quality and capacity. For example, any $Fe^0$ plated on a pristine (e.g., untreated) bipolar plate including such a resin rich layer may crack and flake, potentially resulting in clogs, or may be uneven, potentially resulting in degraded membranes (e.g., the separator 24) and shorting due to $Fe^0$ accumulation and dendrite formation over extended cycling.

To mitigate such plating issues, as well as to prevent electrochemical performance losses, a continuous surface morphology of the resin rich layer may be disrupted via pretreatment of the first bipolar plate 36 prior to full charge cycling (e.g., cycling charging at a single, preset plating current density followed by discharging) of the redox flow battery cell 18. As used herein, "continuous" when describing a surface morphology may refer to a substantially smooth and uninterrupted surface ("substantially" may be used herein as a qualifier meaning "effectively" or "practically"). In contrast, "disrupted" when describing a surface morphology may refer to a surface having been substantially pitted, conditioned, etched, roughened, coarsened, cracked, incised, or otherwise deformed (accordingly, cracking may be desirable under select conditions, such as when cracking is limited to the resin rich layer and does not result in flaking of the resin rich layer or plating thereon). Further, "pristine" when describing a given bipolar plate configuration may refer to a bipolar plate being formed (e.g., from compression or injection molding) without any subsequent treatment prior to undergoing full charge cycling in a given redox flow battery system. In contrast, "pretreated" when describing a given bipolar plate configuration may refer to post-formation treatment to disrupt or otherwise condition a surface morphology of the bipolar plate for improved electrochemical performance and/or structural integrity (the post-treatment being performed prior to the bipolar plate undergoing full charge cycling in a given redox flow battery system, hence "pretreated").

The pretreatment may be a mechanical pretreatment, such as abrasion, sand blasting, sand paper polishing, a timing belt, etc. However, though such mechanical pretreatments may mitigate some electrochemical performance losses in certain cases, long-term durability may be difficult to sustain (e.g., due to uneven plating leading to dendritic formation, etc.). Unexpectedly, even when a given mechanical pretreatment process is designed to incise deep etches within the resin rich layer, poor plating performance may persist. Additionally or alternatively, imprecise mechanical treatment may lead to small flakes and particulates which must be removed prior to inclusion of the pretreated bipolar plate in a battery environment. Such flake and particulate removal constitutes extra processing time, cost, and complexity and, if incomplete, may leave small amounts of flakes or particulates detrimental to battery operation.

Accordingly, embodiments are provided herein to both mitigate electrochemical performance losses and retain long-term durability via pretreating bipolar plates (e.g., first bipolar plate 36) for plating electrodes (e.g., negative electrode 26) of redox flow battery systems (e.g., redox flow battery system 10). In an exemplary embodiment, and as described in detail below with reference to FIGS. 2A and 2B, a bipolar plate may be pretreated via chemical disruption of at least one surface thereof, where the chemical disruption may include electrochemical etching and/or chemical treatment of the at least one surface. The pretreated bipolar plate may be positioned in a redox flow battery system, whereupon undergoing full charge cycling, the pretreated bipolar plate may induce uniform plating and substantially consistent plating performance over a useful life of the redox flow battery system [as used herein, "uniform" when referring to plating or a given surface feature may refer to a substantially similar coverage and depth thereof on a given surface or on any threshold portion of the given surface (e.g., a total surface area or less than the total surface area)]. In this way, long-term durability and processing issues associated with mechanical pretreatment of bipolar plates may be obviated without sacrificing electrochemical performance via substitution of such mechanical pretreatment with electrochemical and/or chemical pretreatments.

Continuing with FIG. 1, the redox flow battery cell 18 may further include the negative battery terminal 40 and the positive battery terminal 42. When a charge current is applied to the battery terminals 40 and 42, the positive electrolyte may be oxidized (loses one or more electrons) at the positive electrode 28, and the negative electrolyte may be reduced (gains one or more electrons) at the negative electrode 26. During battery discharge, reverse redox reactions may occur on the electrodes 26 and 28. In other words, the positive electrolyte may be reduced (gains one or more electrons) at the positive electrode 28, and the negative electrolyte may be oxidized (loses one or more electrons) at the negative electrode 26. An electrical potential difference across the battery may be maintained by the electrochemical redox reactions in the positive electrode compartment 22 and the negative electrode compartment 20, and may induce a current through a current collector while the reactions are sustained. An amount of energy stored by a redox battery may be limited by an amount of electroactive material available in electrolytes for discharge, depending on a total volume of electrolytes and a solubility of the electroactive materials.

The redox flow battery system 10 may further include the integrated multi-chambered electrolyte storage tank 110. The multi-chambered electrolyte storage tank 110 may be divided by a bulkhead 98. The bulkhead 98 may create multiple chambers within the multi-chambered electrolyte storage tank 110 so that both the positive and negative electrolytes may be included within a single tank. The negative electrolyte chamber 50 holds negative electrolyte including the electroactive materials, and the positive electrolyte chamber 52 holds positive electrolyte including the electroactive materials. The bulkhead 98 may be positioned within the multi-chambered electrolyte storage tank 110 to yield a desired volume ratio between the negative electrolyte chamber 50 and the positive electrolyte chamber 52. In one example, the bulkhead 98 may be positioned to set a volume ratio of the negative and positive electrolyte chambers 50 and 52 according to a stoichiometric ratio between the negative and positive redox reactions. FIG. 1 further illustrates a fill height 112 of the multi-chambered electrolyte storage tank 110, which may indicate a liquid level in each tank compartment. FIG. 1 also shows a gas head space 90 located above the fill height 112 of the negative electrolyte chamber 50, and a gas head space 92 located above the fill height 112 of the positive electrolyte chamber 52. The gas head space 92 may be utilized to store hydrogen gas generated through operation of the redox flow battery (e.g., due to proton reduction and iron corrosion side reactions) and conveyed to the multi-chambered electrolyte storage tank 110 with returning electrolyte from the redox flow battery cell 18. The hydrogen gas may be separated spontaneously at a gas-liquid interface (e.g., the fill height 112) within the multi-chambered electrolyte storage tank 110, thereby precluding having additional gas-liquid separators as part of the redox flow battery system 10. Once separated from the electrolyte, the hydrogen gas may fill the gas head spaces 90 and 92. As such, the stored hydrogen gas may aid in purging other gases from the multi-chambered electrolyte storage tank 110, thereby acting as an inert gas blanket for reducing oxidation of electrolyte species, which may help to reduce redox flow battery capacity losses. In this way, utilizing the integrated multi-chambered electrolyte storage tank 110 may forego having separate negative and positive electrolyte storage tanks, hydrogen storage tanks, and gas-liquid separators common to conventional redox flow battery systems, thereby simplifying a system design, reducing a physical footprint of the redox flow battery system 10, and reducing system costs.

FIG. 1 also shows a spillover hole 96, which may create an opening in the bulkhead 98 between the gas head spaces 90 and 92, and may provide a means of equalizing gas pressure between the chambers 50 and 52. The spillover hole 96 may be positioned at a threshold height above the fill height 112. The spillover hole 96 may further enable a capability to self-balance the electrolytes in each of the negative and positive electrolyte chambers 50 and 52 in the event of a battery crossover. In the case of an all-iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but overall electrolyte composition, battery module performance, and battery module capacity may be maintained. Flange fittings may be utilized for all piping connections for inlets and outlets to and from the multi-chambered electrolyte storage tank 110 to maintain a continuously pressurized state without leaks. The multi-chambered electrolyte storage tank 110 may include at least one outlet from each of the negative and positive electrolyte chambers 50 and 52, and at least one inlet to each of the negative and positive electrolyte chambers 50 and 52. Furthermore, one or more outlet connections may be provided from the gas head spaces 90 and 92 for directing hydrogen gas to rebalancing reactors 80 and 82.

Although not shown in FIG. 1, the integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers 50 and 52 may include one or more heaters. In the case where only the positive electrolyte chamber 52 includes one or more heaters, the negative electrolyte may be heated by transferring heat generated at the redox flow battery cell 18 to the negative electrolyte. In this way, the redox flow battery cell 18 may heat and facilitate temperature regulation of the negative electrolyte. The one or more heaters may be actuated by a controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte may be increased. The electrolyte temperature may be indicated by one or more temperature sensors mounted at the multi-chambered electrolyte storage tank 110, such as sensors 60 and 62. As examples, the one or more heaters may include coil type heaters or other immersion heaters immersed in the electrolyte fluid, or surface mantle type heaters that transfer heat conductively through the walls of the negative and positive electrolyte chambers 50 and 52 to heat the fluid therein. Other known types of tank heaters may be employed without departing from the scope of the present disclosure. Furthermore, the controller 88 may deactivate the one or more heaters in the negative and positive electrolyte chambers 50 and 52 in response to a liquid level decreasing below a solids fill threshold level. Said in another way, in some examples, the controller 88 may activate the one or more heaters in the negative and positive electrolyte chambers 50 and 52 only in response to a liquid level increasing above the solids fill threshold level. In this way, activating the one or more heaters without sufficient liquid in the negative and/or positive electrolyte chambers 50, 52 may be averted, thereby reducing a risk of overheating or burning out the heater(s).

Further still, one or more inlet connections may be provided to each of the negative and positive electrolyte chambers 50 and 52 from a field hydration system (not shown). In this way, the field hydration system may facilitate commissioning of the redox flow battery system 10, including installing, filling, and hydrating the redox flow battery system 10, at an end-use location. Furthermore, prior to commissioning the redox flow battery system 10 at the end-use location, the redox flow battery system 10 may be dry-assembled at a battery manufacturing facility different from the end-use location without filling and hydrating the redox flow battery system 10, before delivering the redox flow battery system 10 to the end-use location. In one example, the end-use location may correspond to a location where the redox flow battery system 10 is to be installed and utilized for on-site energy storage. Said another way, the redox flow battery system 10 may be designed such that, once installed and hydrated at the end-use location, a position of the redox flow battery system 10 may become fixed, and the redox flow battery system 10 may no longer be deemed a portable, dry system. Thus, from a perspective of an end-user, the dry, portable redox flow battery system 10 may be delivered on-site, after which the redox flow battery system 10 may be installed, hydrated, and commissioned. Prior to hydration, the redox flow battery system 10 may be referred to as a dry, portable system, the redox flow battery system 10 being free of or without water and wet electrolyte. Once hydrated, the redox flow battery system 10 may be referred to as a wet, non-portable system, the redox flow battery system 10 including wet electrolyte.

Further illustrated in FIG. 1, electrolyte solutions primarily stored in the multi-chambered electrolyte storage tank 110 may be pumped via the negative and positive electrolyte pumps 30 and 32 throughout the redox flow battery system 10. Electrolyte stored in the negative electrolyte chamber 50 may be pumped via the negative electrolyte pump 30 through the negative electrode compartment 20 side of the redox flow battery cell 18, and electrolyte stored in the positive electrolyte chamber 52 may be pumped via the positive electrolyte pump 32 through the positive electrode compartment 22 side of the redox flow battery cell 18.

The electrolyte rebalancing reactors 80 and 82 may be connected in line or in parallel with the recirculating flow paths of the electrolyte at the negative and positive sides of the redox flow battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in a return flow path from the negative and positive electrode compartments 20 and 22 to the negative and positive electrolyte chambers 50 and 52, respectively. The electrolyte rebalancing reactors 80 and 82 may serve to rebalance electrolyte charge imbalances in the redox flow battery system 10 occurring due to side reactions, ion crossover, and the like, as described herein. In one example, electrolyte rebalancing reactors 80 and 82 may include trickle bed reactors, where the hydrogen gas and electrolyte may be contacted at catalyst surfaces in a packed bed for carrying out the electrolyte rebalancing reaction. In other examples, the rebalancing reactors 80 and 82 may include flow-through type reactors that are capable of contacting the hydrogen gas and the electrolyte liquid and carrying out the electrolyte rebalancing reactions absent a packed catalyst bed.

During operation of the redox flow battery system 10, sensors and probes may monitor and control chemical properties of the electrolyte such as electrolyte pH, concentration, SOC, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72 and 70 may be pH probes, optical probes, pressure sensors, voltage sensors, etc. It will be appreciated that sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank may be supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, the controller 88 may send signals to actuators such as valves and pumps of the field hydration system during hydration of the redox flow battery system 10. Sensor information may be transmitted to the controller 88 which may in turn actuate the pumps 30 and 32 to control electrolyte flow through the redox flow battery cell 18, or to perform other control functions, as an example. In this manner, the controller 88 may be responsive to one or a combination of sensors and probes.

The redox flow battery system 10 may further include a source of hydrogen gas. In one example, the source of hydrogen gas may include a separate dedicated hydrogen gas storage tank. In the example of FIG. 1, hydrogen gas may be stored in and supplied from the integrated multi-chambered electrolyte storage tank 110. The integrated multi-chambered electrolyte storage tank 110 may supply additional hydrogen gas to the positive electrolyte chamber 52 and the negative electrolyte chamber 50. The integrated multi-chambered electrolyte storage tank 110 may alternately supply additional hydrogen gas to an inlet of the electrolyte rebalancing reactors 80 and 82. As an example, a mass flow meter or other flow controlling device (which may be controlled by the controller 88) may regulate flow of the hydrogen gas from the integrated multi-chambered electrolyte storage tank 110. The integrated multi-chambered electrolyte storage tank 110 may supplement the hydrogen gas generated in the redox flow battery system 10. For example, when gas leaks are detected in the redox flow battery system 10 or when a reduction reaction rate is too low at low hydrogen partial pressure, hydrogen gas may be supplied from the integrated multi-chambered electrolyte storage tank 110 in order to rebalance the SOC of the electroactive materials in the positive electrolyte and the negative electrolyte. As an example, the controller 88 may supply hydrogen gas from the integrated multi-chambered electrolyte storage tank 110 in response to a measured change in pH or in response to a measured change in SOC of an electrolyte or an electroactive material.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and the controller 88, in response to the pH increase, may increase a supply of hydrogen gas from the integrated multi-chambered electrolyte storage tank 110 to the redox flow battery system 10. As a further example, the controller 88 may supply hydrogen gas from the integrated multi-chambered electrolyte storage tank 110 in response to a pH change, wherein the pH increases beyond a first threshold pH or decreases beyond a second threshold pH. In the case of an IFB, the controller 88 may supply additional hydrogen to increase a rate of reduction of $Fe^{3+}$ ions and a rate of production of protons, thereby reducing the pH of the positive electrolyte. Furthermore, the pH of the negative electrolyte may be lowered by hydrogen reduction of $Fe^{3+}$ ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of $Fe^{3+}$ ions (crossing over from the positive electrode compartment 22) as $Fe(OH)_3$.

Other control schemes for controlling a supply rate of hydrogen gas from the integrated multi-chambered electrolyte storage tank 110 responsive to a change in an electrolyte pH or to a change in an electrolyte SOC, detected by other sensors such as an oxygen-reduction potential (ORP) meter or an optical sensor, may be implemented. Further still, the change in pH or SOC triggering action of the controller 88 may be based on a rate of change or a change measured over a time period. The time period for the rate of change may be predetermined or adjusted based on time constants for the redox flow battery system 10. For example, the time period may be reduced if a recirculation rate is high, and local changes in concentration (e.g., due to side reactions or gas leaks) may quickly be measured since the time constants may be small.

The controller 88 may further execute control schemes based on an operating mode of the redox flow battery system 10. For example, and as discussed below with reference to FIGS. 2A and 2B, the controller 88 may control charging and discharging of the redox flow battery cell 18 so as to electrochemically etch the first bipolar plate 36 for use with the negative electrode 26 via a step charging process. Specifically, after the (pristine) first bipolar plate 36 has been positioned in one of the electrode compartments 20 and 22, the controller 88 may command charging of the redox flow battery cell 18 at multiple discrete plating current densities for each charging cycle of one or more initial charging cycles to electrochemically etch at least one surface of the pristine bipolar plate. Thereafter, full charge cycling may be initiated with the etched (e.g., pretreated) first bipolar plate 36, wherein the controller 88 may command charging of the redox flow battery cell 18 at a single plating current density for each charging cycle during full charge cycling such that the negative electrode 26 may be uniformly plated (as facilitated by the etched first bipolar plate 36).

As another example, the controller 88 may further control charging and discharging of the redox flow battery cell 18 so as to cause iron preformation at the negative electrode 26 during system conditioning (where system conditioning may include an operating mode employed to optimize electrochemical performance of the redox flow battery system 10 outside of battery cycling). That is, during system conditioning, the controller 88 may adjust one or more operating conditions of the redox flow battery system 10 to plate iron metal on the negative electrode 26 to improve a battery charge capacity during subsequent battery cycling (thus, the iron metal may be preformed for battery cycling). The controller 88 may further execute electrolyte rebalancing as discussed above to rid the redox flow battery system 10 of excess hydrogen gas and reduce $Fe^{3+}$ ion concentration. In this way, preforming iron at the negative electrode 26 and running electrolyte rebalancing during the system conditioning may increase an overall capacity of the redox flow battery cell 18 during battery cycling by mitigating iron plating loss. As used herein, battery cycling (also referred to as "charge cycling") may include alternating between a charging mode and a discharging mode of the redox flow battery system 10.

It will be appreciated that all components apart from the sensors 60 and 62 and the integrated multi-chambered electrolyte storage tank 110 (and components included therein) may be considered as being included in a power module 120. As such, the redox flow battery system 10 may be described as including the power module 120 fluidly coupled to the integrated multi-chambered electrolyte storage tank 110 and communicatively coupled to the sensors 60 and 62. In some examples, each of the power module 120 and the multi-chambered electrolyte storage tank 110 may be included in a single housing (not shown), such that the redox flow battery system 10 may be contained as a single unit in a single location. It will further be appreciated the positive electrolyte, the negative electrolyte, the sensors 60 and 62, the electrolyte rebalancing reactors 80 and 82, and the integrated multi-chambered electrolyte storage tank 110 (and components included therein) may be considered as being included in an electrolyte subsystem 130. As such, the electrolyte subsystem 130 may supply one or more electrolytes to the redox flow battery cell 18 (and components included therein).

Referring now to FIGS. 2A and 2B, a flow chart of a method 200 for preparing and operating a redox flow battery system including a pretreated bipolar plate and a flow chart of a method 250 for electrochemically and chemically pretreating the bipolar plate for use with the redox flow battery system are respectively depicted. In an exemplary embodiment, the redox flow battery system and the pretreated bipolar plate may respectively be the redox flow battery system 10 and the first bipolar plate 36 described in detail above with reference to FIG. 1. Accordingly, each of methods 200 and 250 may be considered with reference to the embodiments of FIG. 1 (though it may be understood that similar methods may be applied to other systems without departing from the scope of the present disclosure). For example, at least some steps of methods 200 and 250 (such as steps involved in electrochemical pretreatment, iron preformation, and charge cycling of the redox flow battery system) may be carried out via the controller 88, and may be stored as executable instructions at a non-transitory storage medium (e.g., memory) communicatively coupled to the controller 88. Further components described with reference to FIGS. 2A and 2B may be examples of corresponding components of the redox flow battery system 10 of FIG. 1.

Referring now to FIG. 2A, at 202, method 200 includes forming a pristine bipolar plate. In one example, a graphite composite starting material may be compression molded or injection molded so as to form the pristine bipolar plate. As a result of the molding, however, a resin rich layer may be formed on outer surfaces of the molded graphite composite starting material. The resin rich layer may be undesirable from an electrochemical perspective, potentially resulting in high resistance, poor conductivity, and poor plating upon inclusion of the pristine bipolar plate in the redox flow battery system.

Accordingly, at 204, method 200 includes disrupting at least one surface of the pristine bipolar plate, where the at least one surface of the pristine bipolar plate may include the resin rich layer. In some examples, disrupting the at least one surface may include mechanically wearing down the resin rich layer, e.g., via abrasion. However, such mechanical wearing may be imprecise in terms of both a resultant surface morphology and an amount of excess residue remaining on the bipolar plate following the mechanical wearing. Addressing such issues may result in extra processing steps, thereby increasing processing time, complexity, and cost.

As an alternative to mechanical wearing, the at least one surface may be chemically and/or electrochemically disrupted or altered such that the bipolar plate may be pretreated for the redox flow battery system. In some examples, the chemical disruption may include one or more of electrochemical etching and chemical treatment (e.g., via soaking of the at least one surface in solution). Though either the electrochemical etching or the chemical treatment may be performed in isolation, a combination thereof may synergistically improve a surface morphology of the at least one surface for electrochemical performance in the redox flow battery system relative to either the electrochemical etching or the chemical treatment alone. Such synergistic effects are described in greater detail below with reference to method 250 of FIG. 2B. As one embodiment, method 250 of FIG. 2B may partially or wholly substitute 204. However, it will be appreciated that method 250 of FIG. 2B constitutes one exemplary embodiment of electrochemical/chemical surface disruption and that additional or alternative pretreatment methods may be implemented within the scope of this disclosure.

In an exemplary embodiment, the bipolar plate may be positioned with a negative (plating) electrode in a negative electrode compartment of the redox flow system such that the bipolar plate is facing towards and in fluidic communication with the negative electrode. In embodiments wherein electrochemical etching is employed, the bipolar plate may be positioned in the redox flow battery system such that electrochemical etching may be conducted via charge cycling of the redox flow battery system (e.g., as opposed to a separate specialized system). In an exemplary embodiment, electrochemical etching may be realized via a step charging process, where a full plating current density (e.g., a current density limit) of the redox flow battery system may be gradually approached via stepwise current density increases for one or more initial (pretreatment) charging cycles. In this way, electrochemical etching may be performed without a significant increase in processing complexity or additional components beyond components already utilized for operation of the redox flow battery system (such as components discussed in detail above with reference to FIG. 1).

In embodiments wherein chemical treatment is employed, the at least one surface may undergo chemical treatment either within the redox flow battery system or in a separate vessel from the redox flow battery system. In some examples, chemical treatment of the bipolar plate may occur prior to insertion of the bipolar plate into the redox flow battery system for electrochemical etching (e.g., prior to the one or more initial charging cycles) or full charge cycling. In other examples, chemical treatment of the bipolar plate may occur following insertion of the bipolar plate into the redox flow battery system for electrochemical etching (e.g., following the one or more initial charging cycles), but prior to full charge cycling. In one example, following electrochemical etching, the bipolar plate may be removed from the redox flow battery system, chemically treated in the separate vessel, and then repositioned in the negative electrode compartment for full charge cycling.

Following, and as a result of, electrochemical etching and chemical treatment, the at least one surface (e.g., including the resin rich layer) may be etched and extensively roughened, such that subsequent plating (e.g., $Fe^0$ plating) on the at least one surface may be substantially free of cracking and excess particulates and flakes (e.g., less than 5% of the plating may include cracking thereon, with excess particulates and flakes being considered absent for practical purposes). In this way, and as discussed in detail below, the bipolar plate may be electrochemically and chemically pretreated such that a morphology of the resin rich layer therein is disrupted and thereby optimized for uniform plating across extended cycling.

At 206, method 200 includes preforming plating on the negative (plating) electrode of the redox flow battery system including the pretreated bipolar plate, e.g., having the disrupted resin rich layer. Plating preformation may be desirable to increase an overall capacity of the redox flow battery system during battery cycling by ensuring sufficient plating on the negative electrode is provided to support an entire electrical load towards an end of discharging. In some examples, plating preformation may be realized by charging the redox flow battery system at a set point or to a desired SOC. For instance, the desired SOC may be 15% in one example. In an exemplary embodiment, the redox flow battery system may be an all-iron hybrid redox flow battery system, and the plating may be $Fe^0$ plating resulting from reduction of $Fe^{2+}$ at the plating electrode during battery charging.

At 208, method 200 includes initiating full charge cycling of the redox flow battery system including the pretreated bipolar plate. As opposed to the step charging process for the electrochemical etching, full charge cycling may include charging the redox flow battery at the full plating current density without a gradual approach. Specifically, a plating current density of the redox flow battery system may be increased to the full plating current density in a single step for each of one or more subsequent charging cycles following the one or more initial charging cycles. The bipolar plate being pretreated as described above, full charge cycling of the redox flow battery system may result in uniform plating of the negative electrode over extended cycling. Accordingly, issues associated with poor plating (e.g., resulting in cracking or flaking and related clogging and poor electrochemical performance) or uneven plating (e.g., resulting in dendritic formation and related membrane damage and shorting) may be obviated. In this way, a redox flow battery system may be prepared and operated with a pretreated bipolar plate so as to mitigate electrochemical performance loss without sacrificing long-term durability.

Referring now to FIG. 2B, at 252, method 250 includes obtaining a pristine and unetched bipolar plate. In an exemplary embodiment, the bipolar plate may be formed as described in detail above at 202 of FIG. 2A. Specifically, the bipolar plate may be formed by injection molding or compression molding a graphite composite starting material. As such, at least one surface of the bipolar plate may include a resin rich layer which, left pristine and unetched, may contribute to high resistance, low conductivity, and poor plating upon inclusion of the bipolar plate in the redox flow battery system.

To mitigate such electrochemical performance issues, the at least one surface of the bipolar plate may be electrochemically etched and chemically treated such that at least a portion of the resin rich layer may be modified for improved plating relative to the pristine and unetched resin rich layer. By combining electrochemical and chemical pretreatment processes in this way, synergistic improvement of a morphology of the at least one surface of the bipolar plate for electrochemical performance may be realized relative to either pretreatment process alone. Specifically, and as discussed below with reference to 258, 260, 262, and 264, electrochemical etching may employ a step charging process which may be tailored to generate etching on the at least one surface having a relatively high magnitude of roughness and a relatively extensive coverage. Chemical treatment may additionally be employed to further vary a depth of the etching by dissolving at least a portion of the at least one surface. As discussed below with reference to 254 and 268, chemical treatment may be performed either prior to or following electrochemical etching. Accordingly, in FIG. 2B, 254 and 268 are indicated in dashing, as either 254 or 268 may be selected depending on when chemical treatment is to be performed.

At 254, method 250 may optionally include chemically treating the at least one surface of the bipolar plate via soaking in a pretreatment solution prior to electrochemical etching. Specifically, the bipolar plate may be soaked in the pretreatment solution for an extended duration to chemically treat the at least one surface. In one example, the pretreatment solution may include a ferric chloride ($FeCl_3$) solution. In one example, the ferric chloride solution may be an aqueous solution. For instance, the ferric chloride may be provided in the pretreatment solution at a concentration of 1.0 M to 6.0 M. In one example, the extended duration may be at least 12 hours (e.g., overnight) or at most 60 hours (e.g., over a weekend). In some examples, chemically treating the bipolar plate may further include cleaning the bipolar plate with isopropyl alcohol, hydrogen peroxide, an acid, an additional ferric chloride solution, or a combination thereof (e.g., prior to soaking in the pretreatment solution). In some examples, chemically treating the bipolar plate may further include rinsing the bipolar plate with water (e.g., following soaking in the pretreatment solution).

In some examples, soaking of the at least one surface in the pretreatment solution may be performed in a separate vessel from the redox flow battery system (e.g., ex situ). In one example, the separate vessel may be placed in an environment configured with sufficient ventilation and may include any suitable container (e.g., a glass dish) for retaining the acidic solution for the extended duration. In other examples, the bipolar plate may be positioned in the redox flow battery system for chemical treatment, such that soaking of the at least one surface may be performed in situ. In an exemplary embodiment, the bipolar plate may be positioned within an electrode compartment facing towards and in fluidic communication with a negative (plating) electrode further housed in the electrode compartment. More specific positioning of the bipolar plate relative to the negative electrode are discussed in detail above with reference to FIG. 1. In this way, no specialized equipment may be employed in chemical treatment of the at least one surface, thereby minimizing processing complexity and cost.

At 256, method 250 may optionally include positioning the bipolar plate in the redox flow battery system for electrochemical etching (e.g., if the bipolar plate was not already positioned in the redox flow battery system for soaking in the pretreatment solution). In one example, the bipolar plate may be positioned as described in detail above at 254 or with reference to FIG. 1.

At 258, method 250 includes electrochemically etching the at least one surface of the bipolar plate by gradually increasing a plating current density of the redox flow battery system to a full plating current density for each of one or more pretreatment charging cycles. Without wishing to be bound by theory, charge cycling of the redox flow battery system to induce plating and deplating at the negative electrode may result in a rougher morphology of the at least one surface and plating with desirable adhesion characteristics. However, rapid, single-step increases to the full plating current density, while generating at least some etching of the at least one surface, may result in flaking of the plating, which may contribute to clogging of electrolyte ports in the negative electrode compartment. Further, charging at only the full plating current density may employ a minimum of four or five charging cycles, which may be undesirable when considering excess processing time resulting therefrom (e.g., a day or more for the four or five charging cycles collectively).

Instead, embodiments provided herein may realize electrochemically etched surfaces by gradually increasing the plating current density via a step charging process. Specifically, gradually increasing the plating current density for each of the one or more pretreatment charging cycles may include increasing the plating current density over a plurality of charging steps for each of the one or more pretreatment charging cycles. In an exemplary embodiment, increasing the plating current density over the plurality of charging steps for each of the one or more pretreatment charging cycles may include, in sequence: (i) at 260, charging the redox flow battery system at a first plating current density to a first SOC; (ii) at 262, charging the redox flow battery system at a second plating current density from the first SOC to a second SOC, the second plating current density being greater than the first plating current density; and (iii) at 264, charging the redox flow battery system at a third plating current density from the second SOC to a third SOC, the third plating current density being greater than the second plating current density, and where the third plating current density may be the full plating current density. To respectively reach the first, second, and third SOCs, charging at the first, second, and third plating current densities may be conducted for first, second, and third durations, respectively.

In one example, a plating current of 2.25 A may be applied, in sequence, at a first current density of 6.7 $mA/cm^2$, a second plating current density of 15 $mA/cm^2$, and a third plating current density of 45 $mA/cm^2$ (e.g., the full plating current density). In an additional or alternative example, each of the first, second, and third durations may be 1.5 hours. In an additional or alternative example, the first SOC may be 10%, the second SOC may be 30%, and the third SOC may be 80%. In some examples, each of the one or more pretreatment charging cycles may charge the redox flow battery system to at most 90% SOC before discharging. Embodiments of the step charging process described herein should not be limited to the aforementioned values, and in further embodiments other values (e.g., other plating current densities, durations, SOCs, overall number of steps, etc.) may be used for the step charging process within the scope of the present disclosure.

The step charging process may realize cohesive plating with each of the one or more pretreatment charging cycles, as well as desirable etching in fewer charging cycles than electrochemical pretreatment utilizing a single-step increase to the full plating current density. As such, in some examples, the one or more pretreatment charging cycles may include fewer than four pretreatment charging cycles. In one example, the one or more pretreatment charging cycles may include only one pretreatment charging cycles.

To mitigate deleterious effects of the resin rich layer on electrochemical performance, complete removal of the resin rich layer may be desired. However, as such complete removal may not be achievable in practice, surface disruption via etching, roughening, etc. may instead be employed to wear down the resin rich layer. Accordingly, one unexpected effect of the bipolar plate etched via the step charging process is that comparable or improved plating quality, as well as comparable long-term durability, may be achieved upon implementation of the etched bipolar plate in the redox flow battery system relative to redox flow battery systems including bipolar plates deep etched via mechanical abrasion or sanding. Thus, a magnitude of depth of etching on the bipolar plate may be less pertinent to electrochemical performance and durability of the redox flow battery system than a magnitude of roughness of the etching. The step charging process may achieve sufficient roughness, in addition to extensive coverage, of the etching on the bipolar plate so that such desirable properties of the redox flow battery system may be realized.

At 266, method 250 includes cleaning excess plating residue from the bipolar plate via soaking in an acidic solution following electrochemical etching. Specifically, the electrochemically etched bipolar plate may be removed from the redox flow battery system, soaked in the acidic solution in a separate vessel (e.g., ex situ), and thereafter repositioned in the negative electrode compartment.

At 268, method 250 may optionally include chemically treating the at least one surface of the bipolar plate via soaking in the pretreatment solution following electrochemical etching. Specifically, the electrochemically etched bipolar plate may be removed from the redox flow battery system, soaked in the pretreatment solution in a separate vessel (e.g., ex situ), and thereafter repositioned in the negative electrode compartment. Alternatively, the electrochemically etched bipolar plate may be treated with the pretreatment solution in the negative electrode compartment (e.g., in situ). Further details of chemical treatment of the at least one surface via soaking in solution are described in detail above at 254. In some examples, however, cleaning the bipolar plate prior to soaking in the pretreatment solution (as described in detail above at 254) may be obviated via the cleaning at 266. As further discussed above, if chemical treatment was performed at 254, chemical treatment at 268 may be omitted and the bipolar plate may be retained in the redox flow battery system following electrochemical etching.

Referring now to FIG. 3, a top perspective view 300 depicting each of a pristine (e.g., unetched) bipolar plate 302 and an electrochemically etched bipolar plate 304 is shown. In an exemplary embodiment, one or both of the bipolar plates 302 and 304 may be prepared for use with a plating electrode of a redox flow battery system, such as the negative electrode 26 and the redox flow battery system 10 as described above in detail with reference to FIG. 1. For example, the pristine bipolar plate 302 may be positioned in a negative electrode compartment of the redox flow battery system such that the pristine bipolar plate 302 may be in fluidic communication with the plating electrode. Therein, in some examples, the pristine bipolar plate 302 may be electrochemically etched via a step charging process, as described above, after which charge cycling may be initiated. Following extended charge cycling (e.g., greater than 100 charge/discharge cycles), repeated plating and deplating at the plating electrode may result in extensive disruptions, etchings, incisions, and other deformations 306 being generated at the pristine bipolar plate 302, thereby forming the electrochemically etched bipolar plate 304. Accordingly, and as shown in the top perspective view 300, the pristine bipolar plate 302 includes a substantially continuous surface and including significantly fewer disruptions, etchings, incisions, and other deformations 306 than the electrochemically etched bipolar plate 304.

Though the electrochemically etched bipolar plate 304 may be formed via greater than 100 charge/discharge cycles, a minimum of four or five 20-80% SOC charge/discharge cycles at a full plating current density (e.g., 45 $mA/cm^2$) may be employed during pretreatment of the pristine bipolar plate 302 to achieve sufficient electrochemical etching for desirable plating quality. However, even four or five charge/discharge cycles may result in lengthy processing times. Further, applying a charging current at the full plating current density without gradually increasing thereto may result in flaking of the plating, which may contribute to clogging and resultant electrochemical performance and durability issues in the redox flow battery system.

Accordingly, FIGS. 4-10 depict examples of bipolar plates included in a redox flow battery system prior to and following electrochemical pretreatment, the electrochemical pretreatment including a step charging process. For example, the step charging process may include applying a charging current of 2.25 A at a first current density of 6.7 mA/cm$^2$ for 1.5 hours up to 10% SOC (e.g., 1866 C), applying the charging current at a second current density of 15 mA/cm$^2$ for 1.5 hours up to 30% SOC (e.g., 4377 C), and applying the charging current at the full plating current density of 45 mA/cm$^2$ for 1.5 hours up to 80% SOC (e.g., 14994 C), where the charging voltage may be 2.5 V. The step charging process may therefore gradually increase a plating current density to the full plating current density during charging of the redox flow battery system. As a result, a higher plating quality may be realized (e.g., with less flaking) over fewer charge/discharge cycles (e.g., only one charge/discharge cycle) as compared to the four or five 20-80% SOC charge/discharge cycles at the full plating current density.

Specifically, FIGS. 4-6 depict views of a first exemplary bipolar plate 401, FIGS. 7 and 8A-8B depict views of a second exemplary bipolar plate 701, and FIGS. 9 and 10 depict views of a third exemplary bipolar plate 901. Each of the first and second exemplary bipolar plates were formed via injection molding or compression molding of a first graphite composite starting material, with the first graphite composite starting material including carbon particles and graphite plates bound by a binder (vinyl ester resin). For the views of FIGS. 4-6, the first exemplary bipolar plate was positioned in a first redox flow battery system configured in an H-cell setup, the first redox flow battery system including respective strips of the first exemplary bipolar plate (having ~1 cm width) on each of a positive electrode side and a negative electrode side, with a VANADion™ membrane as a separator therebetween. Excepting an active area of 2.5 cm$^2$, each of the strips were coated in an epoxy glue for isolation purposes. For the views of FIGS. 7-10, the second and third exemplary bipolar plates were respectively positioned in second and third redox flow battery systems, each of the second and third redox flow battery system having 2.8 mm AvCarb® felt with a felt compression of 5% on a positive electrode side and the respective exemplary bipolar plate having a surface area of 50 cm$^2$ on a negative electrode side, with a Chemours™ membrane as a separator therebetween. A mesh spacer was further included in each of the second and third redox flow battery systems as part of a negative electrode thereof. Plating in each of the first, second, and third redox flow battery systems was initially conducted for a single charging cycle employing the step charging process at a battery temperature of 60° C. A liquid electrolyte was provided for each of the first, second, and third redox flow battery systems, the electrolyte having an Fe$^{2+}$ concentration of 1.40 to 1.50 M, an Mn$^{2+}$ concentration of 0.1 M, an H$_3$BO$_3$ concentration of 0.1 M, and a KCl concentration of 2.0 M and a flow rate of 120 mL/min. A pH of the electrolyte at the positive electrode side of each of the first, second, and third redox flow battery systems was 0.4 to 0.5 and a pH of the electrolyte at the negative electrode side of each of the first, second, and third redox flow battery systems was 1.3 to 1.5. 250 mL of the electrolyte was supplied to each of the positive and negative electrode sides of each of the first, second, and third redox flow battery systems.

Referring now to FIG. 4, a magnified view 400 depicting a pristine surface 402 of the first exemplary bipolar plate 401 prior to each of electrochemical step charging (e.g., including applying charging current up to the full plating current density via multiple charging steps) and initial charge cycling of the first redox flow battery system (e.g., including applying charging current at the full plating current density via a single charging step) is shown. The surface 402 may be considered a relatively smooth and flat binder (resin) rich layer. Specifically, a morphology of the surface 402 may be characterized by relatively shallow ridges 404 interrupted by binder clusters 406.

Referring now to FIG. 5, a magnified view 500 depicting a plating 552 on the first exemplary bipolar plate 401 following electrochemical step charging and prior to initial charge cycling of the first redox flow battery system is shown. Specifically, the electrochemical step charging may generate etching on at least one surface of the first exemplary bipolar plate, which may result in uniform and continuous plating and improve an adhesion thereof. As shown, defects of the plating 552 may be limited to bubbling 558 due to H$_2$ generation.

Referring now to FIGS. 6A-6C, a top view 600 of the first exemplary bipolar plate 401 is shown in FIG. 6A, a first magnified inset view 654 of the first exemplary bipolar plate 401 is shown in FIG. 6B, and a second magnified inset view 656 of the first exemplary bipolar plate 401 is shown in FIG. 6C. The views of the first exemplary bipolar plate 401 depict a plating 652 on the first exemplary bipolar plate 401 following each of electrochemical step charging and initial charge cycling of the first redox flow battery system. Specifically, following electrochemical step charging, the first exemplary bipolar plate 401 was acid soaked overnight to remove any residue and then replated at the full plating current density of 45 mA/cm$^2$ for 2 hours at 60° C.

The top view 600 of FIG. 6A shows a portion of the first exemplary bipolar plate 401 including the active area after replating. As shown, the active area includes the plating 652 thereon, the plating 652 being uniform and continuous excepting the bubbling 558 from H$_2$ generation during the electrochemical step charging. However, for greater detail, the first and second magnified inset views 654 and 656 are shown in FIGS. 6B and 6C, respectively, depicting areas indicated by dashed boxes 604 and 606 of FIG. 6A, respectively. The first and second magnified inset views 654 and 656 show that the plating 652 is largely uniform and continuous, a surface thereof being interrupted infrequently by the bubbling 558. The second magnified inset view 656 of FIG. 6C (depicting a corner of the portion of the first exemplary bipolar plate 401 shown in FIG. 6A) further shows minor cracking 658, ascribable to localized high current density. However, the minor cracking 658 may be significantly less extensive than cracking resulting from single-step application of the full plating charge density without first performing electrochemical step charging. Further, as discussed in detail below with reference to FIGS. 8A-8B, such minor cracking may have negligible impact on electrochemical performance.

Referring now to FIG. 7, a top view 700 depicting a plating 752 of the second exemplary bipolar plate 701 following electrochemical step charging and prior to each of iron preformation at 15% SOC and initial charge cycling of the second redox flow battery system is shown. As shown, the second exemplary bipolar plate 701 is configured in a test stand 704. Similar to the plating of the first exemplary bipolar plate 401, the plating 752 of the second exemplary bipolar plate 701 following electrochemical step charging is largely uniform and continuous. However, minor cracking 758 is present.

Referring now to FIGS. 8A-8B, each of a top view 800 (FIG. 8A) and a magnified inset view 854 (FIG. 8B) depicting a plating 852 of the second exemplary bipolar plate 701 following each of electrochemical step charging, iron preformation at 15% SOC, and initial charge cycling of the second redox flow battery system is shown. As shown in FIG. 7, the second exemplary bipolar plate 701 is configured in the test stand 704. Following each of electrochemical step charging and iron preformation, initial charge cycling including seven 20-80% charge/discharge cycles was conducted. The electrolyte was then replaced and the second redox flow battery system was charged to 80% SOC at the full plating current density.

As shown in the top view 800 of FIG. 8A, no significant cracking in the plating 852 is observed following initial charge cycling. Even at greater detail, as shown by the magnified inset view 854 of FIG. 8B depicting an area indicated by a dashed box 804 in FIG. 8A, the plating 852 is shown to be uniform, continuous, and free from defect. Further, no evidence of shorting or electrochemical performance decay was observed during initial charge cycling. Accordingly, even though minor cracking may initially appear following electrochemical step charging (as shown at FIG. 7), such cracking may not result in significant electrochemical performance losses. In this way, uniform and continuous plating may be generated during full charge cycling of a redox flow battery system following electrochemical step charging to etch a bipolar plate without shorting, electrochemical performance loss, or physical damage to various components of the redox flow battery system.

Referring now to FIG. 9, a magnified view 900 depicting a pristine surface 902 of the third exemplary bipolar plate 901 prior to each of electrochemical step charging (e.g., including applying charging current up to the full plating current density via multiple charging steps) and initial charge cycling of the third redox flow battery system (e.g., including applying charging current at the full plating current density via a single charging step) is shown. The surface 902 may be considered a relatively smooth and flat binder (resin) rich layer characterized by infrared (IR) spectroscopy as having relatively high resin content. Specifically, a morphology of the surface 902 may be characterized by relatively shallow ridges 904 interrupted by binder clusters 906. A contact angle of 70° was observed on the surface 902, and a water absorption of the third exemplary bipolar plate was determined to be 0.013 g/cm$^3$. Further, a density of the third exemplary bipolar plate was determined to be 1.759 g/cm$^3$.

Referring now to FIG. 10, a magnified view 1000 depicting a surface 1002 of the third exemplary bipolar plate 901 following each of electrochemical step charging (e.g., including applying charging current up to the full plating current density via multiple charging steps) and initial charge cycling of the third redox flow battery system (e.g., including applying charging current at the full plating current density via a single charging step) is shown. The surface 1002 may be significantly reduced in binder (resin) content (as characterized by IR spectroscopy) as compared to the pristine surface 902 discussed in detail above with reference to FIG. 9.

Specifically, a morphology of the surface 1002 may be characterized by a plurality of pores 1008 in the binder rich layer, the plurality of pores 1008 having "ink bottle" shapes in some examples. A width of the plurality of pores 1008 may range from 100 to 500 µm, and a depth of the plurality of pores 1008 may be 118 µm. A contact angle of 45° was observed on the surface 1002, and a water absorption of the third exemplary bipolar plate was determined to be 0.041 g/cm$^3$. Further, a density of the third exemplary bipolar plate 901 was determined to be 1.724 g/cm$^3$.

Even without electrochemical step charging (or abrasive mechanical pretreatment), electrochemical performance in a redox flow battery system may still be maintained via chemical treatment of a bipolar plate included therein. Accordingly, FIGS. 11-14 depict views of a fourth exemplary bipolar plate 1101 prior to and following chemical treatment, and electrochemical performance results therefrom upon inclusion of the fourth exemplary bipolar plate 1101 in a fourth redox flow battery system. For example, the chemical treatment may include cleaning of the fourth exemplary bipolar plate 1101 in isopropyl alcohol, following by soaking in a 1 M FeCl$_3$ solution for at least 48 hours.

The fourth exemplary bipolar plate 1101 was formed via injection molding or compression molding of a second graphite composite starting material, with the second graphite composite starting material including layered graphite bound by a thermoset polymeric binder (resin). Specifically, the fourth exemplary bipolar plate may be characterized by a polymer content of 10%, a density of 1.85 g/cm$^3$, a thickness of 1.6 mm, a tensile strength of 40 MPa, a compressive strength of 400 MPa, an electrical resistivity along a vertical direction of the fourth exemplary bipolar plate (e.g., parallel with the thickness thereof) of 0.00035 Ω·cm, an area specific resistance along the vertical direction of the fourth exemplary bipolar plate of 0.0002Ω, and a permeability (in He gas) of <5×10$^{-3}$, with total impurities of 150 ppm. The fourth exemplary bipolar plate was positioned in the fourth redox flow battery system, the fourth redox flow battery system having 2.8 mm AvCarb® felt with a felt compression of 5% on a positive electrode side and the fourth exemplary bipolar plate having a surface area of 50 cm$^2$ on a negative electrode side, with a VANADion™ membrane as a separator therebetween. A mesh spacer was further included in the fourth redox flow battery system as part of the negative electrode. A liquid electrolyte was provided for the fourth redox flow battery system, the electrolyte having an Fe$^{2+}$ concentration of 1.50 M (e.g., from dissolved FeCl$_2$), an Mn$^{2+}$ concentration of 0.8 M (e.g., from dissolved MnCl$_2$), an H$_3$BO$_3$ concentration of 0.4 M, and a KCl concentration of 2.0 M and a flow rate of 120 mL/min.

Figure 11:
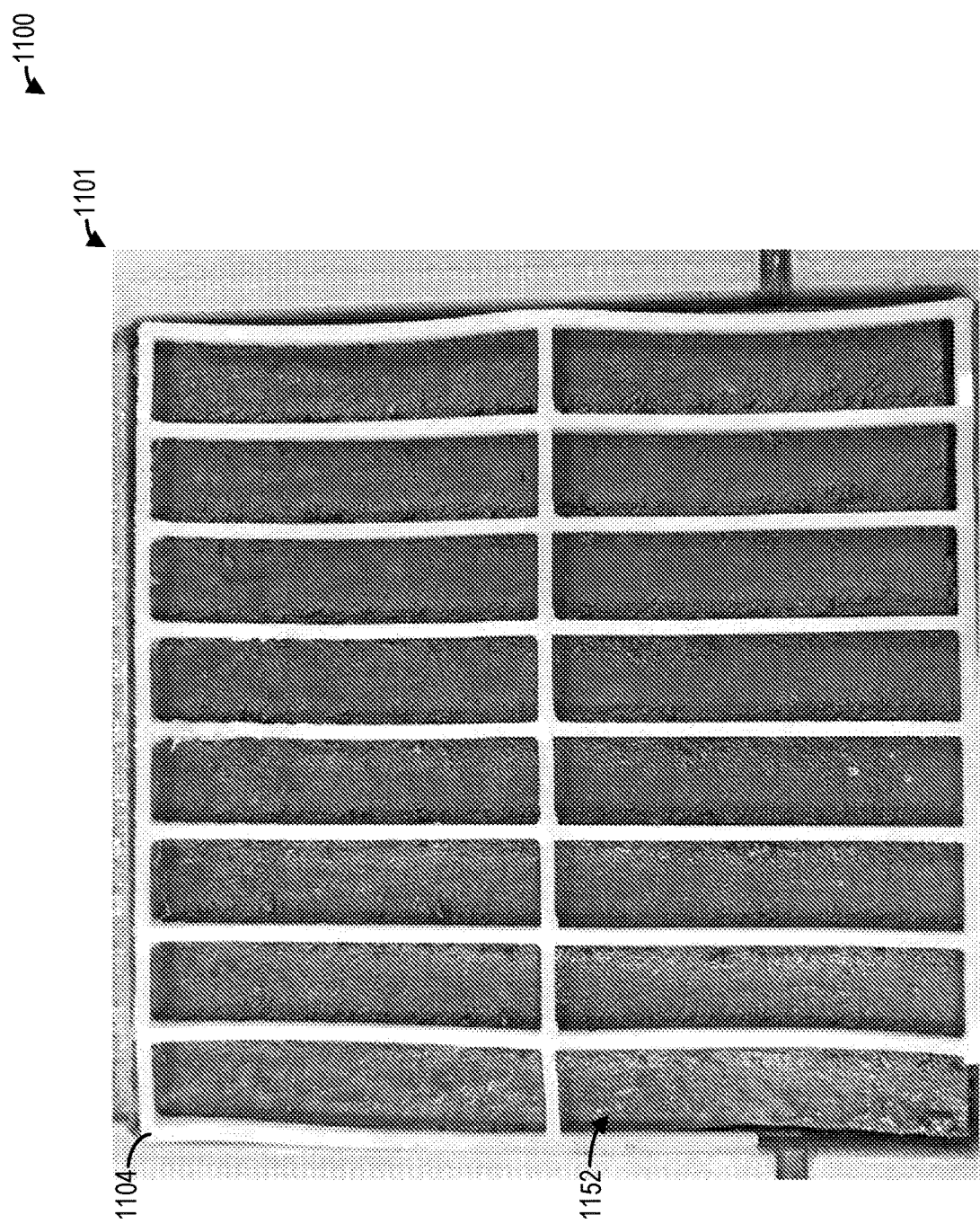
FIG. 11 shows a top view of a fourth exemplary bipolar plate following chemical pretreatment and prior to initial charge cycling of a redox flow battery system including the fourth exemplary bipolar plate.

Referring now to FIG. 11, a top view 1100 depicting a plating 1152 of the fourth exemplary bipolar plate 1101 following chemical treatment and prior to initial charge cycling of the fourth redox flow battery system is shown. As shown, the fourth exemplary bipolar plate 1101 is configured in a test stand 1104. The plating 1152 of the fourth exemplary bipolar plate 1101 following chemical treatment is continuous, free from defect, and apparently uniform.

Figure 12:
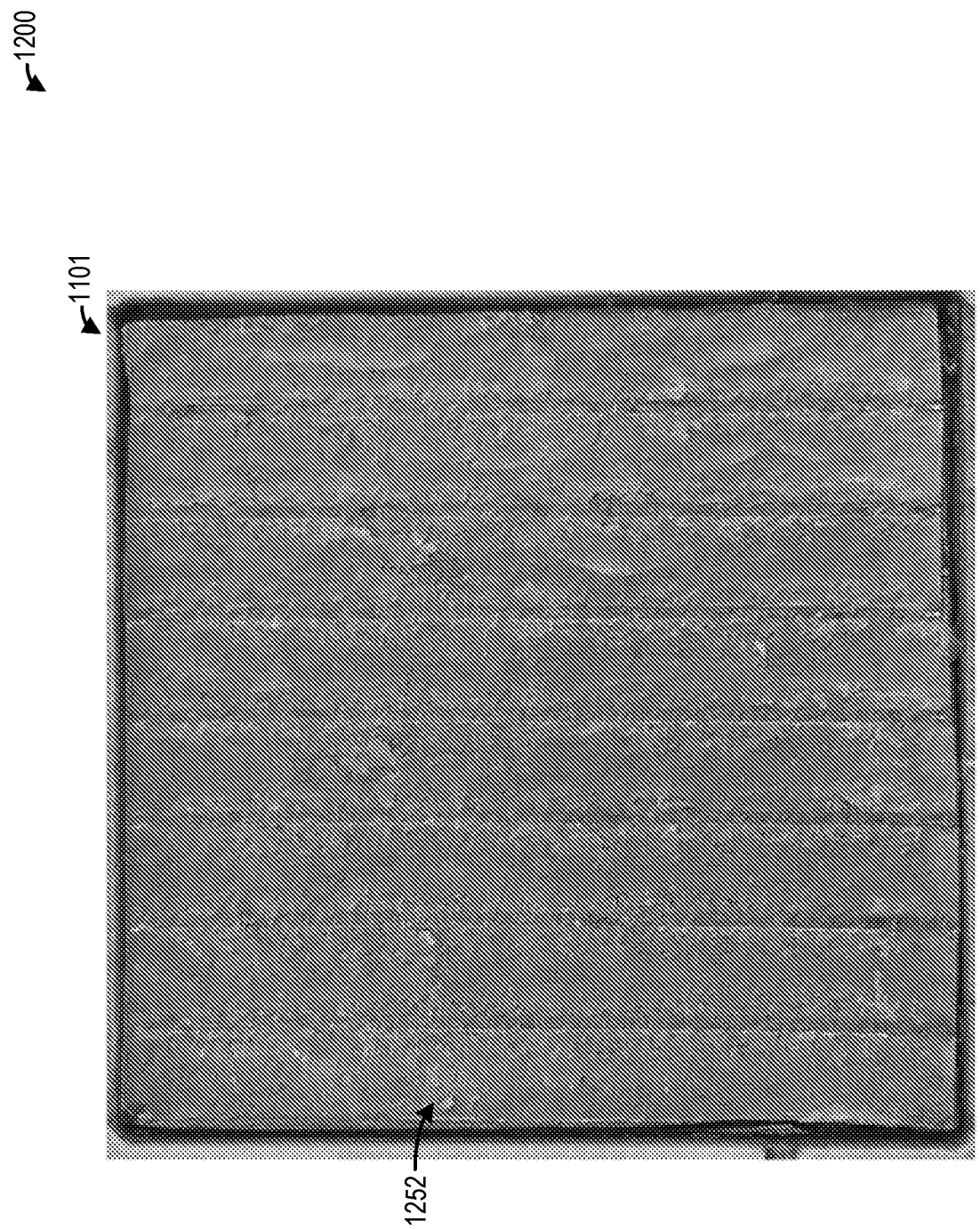
FIG. 12 shows a top view of the fourth exemplary bipolar plate following each of chemical pretreatment and initial charge cycling of the redox flow battery system including the fourth exemplary bipolar plate.

Referring now to FIG. 12, a top view 1200 depicting a plating 1252 of the fourth exemplary bipolar plate 1101 following each of chemical treatment, iron preformation at 15% SOC, and initial charge cycling (120 20-80% SOC charge/discharge cycles) of the fourth redox flow battery system is shown. As shown, the fourth exemplary bipolar plate 1101 has been removed from the test stand 1104 of FIG. 11. The plating 1252 following each of chemical treatment and initial charge cycling was significantly rougher and less uniform than the plating following electrochemical step charging and initial charge cycling (as described in detail above with reference to FIGS. 8A-8B). Such less uniform plating may result in dendritic formation and subsequent shorting over extended charge cycling (e.g., charge/discharge cycles following initial charge cycling).

Referring now to FIG. 13, a top view 1300 of a (membrane) separator 1302 of the fourth redox flow battery system following each of chemical treatment of the fourth exemplary bipolar plate 1101 and initial charge cycling of the fourth redox flow battery system is shown. As shown, the separator 1302 includes light scuffing 1358 resulting from physical contact with the plating 1252 of FIG. 12. Rupturing of the separator 1302 may result if dendrites form as a result of the excessive roughening and non-uniformity of the plating 1252 of FIG. 12, thereby leading to shorts in the fourth redox flow battery system. In this way, long-term durability of a redox flow battery system may be difficult to realize with chemical treatment of a bipolar plate included therein alone. However, and as discussed in detail above with reference to FIGS. 8A-8B, electrochemical step charging in combination with chemical treatment of the bipolar plate prior to full charge cycling may maintain both electrochemical performance and durability of the redox flow battery system over a useful life thereof.

Referring now to FIG. 14, an example plot 1400 depicting each of coulombic, voltaic, and energy efficiencies of the fourth redox flow battery system following initial charge cycling is shown. As shown in example plot 1400, an abscissa represents a number of charge/discharge cycles and an ordinate represents each of the coulombic, voltaic, and energy efficiencies plotted over the charge/discharge cycles. Specifically, a set of markers 1402 (open circles) indicates the coulombic efficiency, a set of markers 1404 (open squares) indicates the voltaic efficiency, and a set of markers 1406 (triangles) indicates the energy efficiency.

The consistent trends in each of the columbic, voltaic, and energy efficiencies as respectively shown by the sets of markers 1402, 1404, and 1406 indicated maintenance of electrochemical performance over full charge cycling following chemical treatment of the fourth exemplary bipolar plate (even with the excessive roughening and non-uniformity of the plating 1252, as described in detail above with reference to FIG. 12). As such, electrochemical performance may be maintained in a redox flow battery system through chemical treatment of a bipolar plate included therein.

In this way, embodiments are provided herein for electrochemically and/or chemically pretreating a bipolar plate for use with a negative electrode of a redox flow battery. Specifically, the bipolar plate may be positioned in a negative electrode compartment of the redox flow battery and in fluidic communication with the negative electrode thereof. In some examples, the bipolar plate may be formed from an injection molded or compression molded graphite composite having a resin rich layer thereon. By pretreating the bipolar plate, the resin rich layer may be etched and roughened such that electrochemical performance losses ascribed to a presence of the layer may be mitigated.

In one example, the bipolar plate may be etched via a step charging process. Specifically, a plating current density may be gradually increased to a current density limit over one charging cycle to obtain a sufficiently etched bipolar plate. Such short charge cycling may be desirable for scaling manufacture of redox flow batteries including the etched bipolar plates relative to employing multiple (e.g., 4 or 5) charging cycles having large stepwise increases in the plating current density (e.g., directly to the current density limit) while achieving similar etching. Unexpectedly, the etched bipolar plate produced by the step charging process may also exhibit comparable or improved plating quality and long-term durability relative to bipolar plates deep etched via mechanical sanding. Specifically, the step charging process may mitigate electrochemical performance losses without sacrificing long-term durability by achieving sufficient roughness and coverage of the etching on the bipolar plate.

In some examples, prior to or following the step charging process, the bipolar plate may also be soaked in solution (e.g., overnight) to further roughen an etched surface of the bipolar plate. Such a combination of chemical treatment (soaking in solution) and electrochemical etching (step charging) may synergistically improve a surface morphology of the bipolar plate for electrochemical performance relative to either the soaking or the step charging process alone. Specifically, the step charging process may provide sufficient roughness of etching, while soaking the bipolar plate in solution may vary a depth of the etching with minimal extra processing.

Such improvements to the surface morphology via chemical treatment of the bipolar plate may be wholly unforeseen, as further hurdles may be otherwise expected to arise from introducing additional chemicals during preparation of the redox flow battery. Specifically, balancing electrolyte pH and electrolyte composition may be especially critical in maintaining electrochemical performance in the redox flow battery. Accordingly, a concentration (e.g., 1 M) and a composition (e.g., $FeCl_3$) of the chemical treatment solution may be carefully and judiciously selected so as to not adversely affect redox chemistry and plating quality at the positive and negative sides of the redox flow battery, respectively.

In one example, a method for a redox flow battery, the method comprising: pretreating a bipolar plate for the redox flow battery by disrupting at least one surface of the bipolar plate; and initiating charge cycling of the redox flow battery, wherein the redox flow battery includes an electrode compartment, the electrode compartment housing the pretreated bipolar plate upon initiation of charge cycling. A first example of the method further includes wherein pretreating the bipolar plate by disrupting the at least one surface comprises: positioning the bipolar plate within the electrode compartment; and thereafter charging the redox flow battery at multiple discrete plating current densities for each charging cycle of one or more initial charging cycles to electrochemically etch the at least one surface, and wherein initiating charge cycling comprises charging the redox flow battery at a single plating current density for each charging cycle following the one or more initial charging cycles to uniformly plate a plating electrode housed in the electrode compartment. A second example of the method, optionally including the first example of the method, further includes wherein the one or more initial charging cycles comprises only one initial charging cycle. A third example of the method, optionally including one or more of the first and second examples of the method, further includes wherein the at least one surface is pristine and unetched prior to pretreatment; and wherein the at least one surface is etched following pretreatment. A fourth example of the method, optionally including one or more of the first through third examples of the method, further comprises preforming iron plating at a plating electrode housed in the electrode compartment following pretreatment and prior to charge cycling. A fifth example of the method, optionally including one or more of the first through fourth examples of the method, further includes wherein pretreating the bipolar plate by disrupting the at least one surface comprises: cleaning the bipolar plate with isopropyl alcohol; and soaking the cleaned bipolar plate in solution for an extended duration to chemically treat the at least one surface. A sixth example of the method, optionally including one or more of the first through fifth examples of the method, further includes wherein the solution comprises a ferric chloride solution. A seventh example of the method, optionally including one or more of the first through sixth examples of the method, further includes wherein the extended duration is at least 12 hours.

In another example, a method for a redox flow battery, the method comprising: positioning a bipolar plate in the redox flow battery such that the bipolar plate is in fluidic communication with a plating electrode of the redox flow battery; and thereafter gradually increasing a plating current density of the redox flow battery to a full plating current density for each of one or more pretreatment charging cycles; and applying current at the full plating current density without gradually increasing the plating current density for each of one or more subsequent charging cycles following the one or more pretreatment charging cycles. A first example of the method further includes wherein gradually increasing the plating current density for each of the one or more pretreatment charging cycles comprises increasing the plating current density over a plurality of charging steps for each of the one or more pretreatment charging cycles. A second example of the method, optionally including the first example of the method, further includes wherein increasing the plating current density over the plurality of charging steps for each of the one or more pretreatment charging cycles comprises, in sequence: charging the redox flow battery at a first plating current density to a first state of charge (SOC); charging the redox flow battery at a second plating current density from the first SOC to a second SOC, the second plating current density being greater than the first plating current density; and charging the redox flow battery at a third plating current density from the second SOC to a third SOC, the third plating current density being greater than the second plating current density. A third example of the method, optionally including one or more of the first and second examples of the method, further includes wherein each of the one or more pretreatment charging cycles charges the redox flow battery to at most 90% SOC before discharging. A fourth example of the method, optionally including one or more of the first through third examples of the method, further includes wherein, for each of the one or more subsequent charging cycles, applying current at the full plating current density without gradually increasing the plating current density uniformly plates the plating electrode with iron metal. A fifth example of the method, optionally including one or more of the first through fourth examples of the method, further comprises soaking the bipolar plate prior to the one or more subsequent charging cycles. A sixth example of the method, optionally including one or more of the first through fifth examples of the method, further includes wherein soaking the bipolar plate is performed prior to the one or more pretreatment charging cycles. A seventh example of the method, optionally including one or more of the first through sixth examples of the method, further includes wherein soaking the bipolar plate is performed following the one or more pretreatment charging cycles.

In yet another example, redox flow battery system, comprising: positive and negative electrode compartments respectively housing positive and negative electrodes; a first bipolar plate positioned in the negative electrode compartment and in fluidic communication with the negative electrode; and a second bipolar plate positioned in the positive electrode compartment and in fluidic communication with the positive electrode, wherein a surface of the first bipolar plate facing toward the negative electrode is etched and roughened, and wherein metal plating formed on the surface is substantially free of cracking and excess particulates and flakes. A first example of the redox flow battery system further includes wherein the surface is etched and roughened by each of performing step charging of the redox flow battery system at a plurality of sequentially increasing plating current densities and soaking the surface in solution. A second example of the redox flow battery system, optionally including the first example of the redox flow battery system, further includes wherein the first bipolar plate is formed by injection molding or compression molding a graphite composite starting material. A third example of the redox flow battery system, optionally including one or more of the first and second examples of the redox flow battery system, further includes wherein the redox flow battery system is an all-iron hybrid redox flow battery system.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a redox flow battery, the method comprising:
   positioning a bipolar plate in the redox flow battery such that the bipolar plate is in fluidic communication with a plating electrode of the redox flow battery; and thereafter
   gradually increasing a plating current density of the redox flow battery to a full plating current density for each of one or more pretreatment charging cycles; and
   applying current at the full plating current density without gradually increasing the plating current density for each of one or more subsequent charging cycles following the one or more pretreatment charging cycles.

2. The method of claim 1, wherein gradually increasing the plating current density for each of the one or more pretreatment charging cycles comprises increasing the plating current density over a plurality of charging steps for each of the one or more pretreatment charging cycles.

3. The method of claim 2, wherein increasing the plating current density over the plurality of charging steps for each of the one or more pretreatment charging cycles comprises, in sequence:
   charging the redox flow battery at a first plating current density to a first state of charge (SOC);
   charging the redox flow battery at a second plating current density from the first SOC to a second SOC, the second plating current density being greater than the first plating current density; and
   charging the redox flow battery at a third plating current density from the second SOC to a third SOC, the third plating current density being greater than the second plating current density.

4. The method of claim 1, wherein each of the one or more pretreatment charging cycles charges the redox flow battery to at most 90% SOC before discharging.

5. The method of claim 1, wherein, for each of the one or more subsequent charging cycles, applying the full plating current density without gradually increasing the plating current density uniformly plates the plating electrode with iron metal.

6. The method of claim 1, further comprising soaking the bipolar plate in $FeCl_3$ solution prior to the one or more subsequent charging cycles.

7. The method of claim 6, wherein soaking the bipolar plate is performed prior to the one or more pretreatment charging cycles.

8. The method of claim 6, wherein soaking the bipolar plate is performed following the one or more pretreatment charging cycles.

* * * * *